United States Patent
Collins et al.

(10) Patent No.: US 11,352,015 B2
(45) Date of Patent: Jun. 7, 2022

(54) METHODS AND SYSTEM FOR PROVIDING VEHICLE DRIFT FOR VEHICLES WITH AUTOMATIC TRANSMISSIONS

(71) Applicant: Ford Global Technologies, LLC, Dearborn, MI (US)

(72) Inventors: Patrick Gordon Collins, Canton, MI (US); Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 16/569,512

(22) Filed: Sep. 12, 2019

(65) Prior Publication Data
US 2021/0078585 A1    Mar. 18, 2021

(51) Int. Cl.
| | | |
|---|---|---|
| *B60W 40/103* | (2012.01) | |
| *B60W 20/40* | (2016.01) | |
| *B60K 6/36* | (2007.10) | |
| *F16H 48/22* | (2006.01) | |
| *B60T 8/17* | (2006.01) | |
| *F16H 61/14* | (2006.01) | |

(52) U.S. Cl.
CPC .......... *B60W 40/103* (2013.01); *B60K 6/36* (2013.01); *B60T 8/17* (2013.01); *B60W 20/40* (2013.01); *F16H 48/22* (2013.01); *B60T 2230/02* (2013.01); *F16H 2061/145* (2013.01)

(58) Field of Classification Search
CPC ....... B60W 40/103; B60W 20/40; B60K 6/36; B60T 8/17; B60T 2230/02; F16H 48/22; F16H 2061/145
See application file for complete search history.

(56) References Cited

U.S. PATENT DOCUMENTS

| | | | |
|---|---|---|---|
| 2014/0297120 A1* | 10/2014 | Cotgrove | ............. B62D 15/025 701/41 |
| 2018/0257631 A1 | 9/2018 | Fodor et al. | |
| 2019/0176801 A1* | 6/2019 | Ruybal | ............... B60L 15/2054 |

FOREIGN PATENT DOCUMENTS

RU    2674739 C2 * 12/2018    .............. B60L 11/14

OTHER PUBLICATIONS

RU 2674739 machine translation, filed Aug. 28, 2021 (Year: 2021).*

* cited by examiner

*Primary Examiner* — Tisha D Lewis
(74) *Attorney, Agent, or Firm* — David Kelley; McCoy Russell LLP

(57) ABSTRACT

Methods and systems are provided for inducing vehicle side slip. In one example, a method includes opening a sole driveline disconnect clutch positioned between an engine and an electric machine upstream of a transmission, and closing the sole driveline disconnect clutch within a predetermined amount of time after opening the sole driveline disconnect without shifting gears of the transmission. In this way, vehicle drift may be reliable initiated in a hybrid electric vehicle with an automatic transmission, without shifting gears of the transmission.

20 Claims, 12 Drawing Sheets

| Scenario | DC clutch | TC lock-up clutch | Engine RPM | Emachine |
|---|---|---|---|---|
| A | Open then closed | No change | Increase | No output |
| B | Open then closed | No change | Increase | Variable |
| C | Open then closed | No change | Increase | Amount requested at eClutch kick initiation |
| D | Maintained closed | Open then closed | Increase | Increase |
| E | Open then closed | Open then closed | Increase | Match engine speed |
| F | Open then closed | Open then closed | Increase | Higher or lower than engine speed |

FIG. 5

METHODS AND SYSTEM FOR PROVIDING VEHICLE DRIFT FOR VEHICLES WITH AUTOMATIC TRANSMISSIONS

FIELD

The present description relates generally to methods and systems for controlling one or more driveline clutches in a driveline of a hybrid vehicle to initiate a drift maneuver.

BACKGROUND/SUMMARY

A driver of a vehicle may desire to operate a vehicle with side slip or drift for a variety of reasons. To induce vehicle side slip, a technique referred to as clutch kick may be used for vehicles with manual transmissions. To initiate a clutch kick, the driver may quickly depress and then release a clutch pedal using one foot, while using another foot to keep an intake throttle open or increase engine speed (RPM). Such action may result in a driveline impulse that causes rear wheels of the vehicle to break traction, thus allowing the driver to perform a vehicle drift maneuver. Such a technique may be used for drifting or any time a driver desires to increase engine speed without shifting gears. However, it may be difficult to initiate drift for some vehicles, for example due to insufficient torque at particular vehicle speeds.

United States Patent Application No. 2018/0257631 discloses a method for controlling vehicle side-slip that includes receiving a steering angle and an accelerator pedal position at a controller of a vehicle, and adjusting an output of a driveline torque source to induce vehicle side-slip in response to the steering angle being greater than a threshold angle and the accelerator pedal position being greater than a threshold position. Specifically, engine and rear drive unit torque output to driven wheels is derived from a desired side slip angle. Furthermore, a gear that may improve the vehicle's capability to operate at the desired side slip angle is selected and shifted to so that wheel slip may be induced and controlled.

However, the inventors have recognized potential issues with the above-mentioned approach. Specifically, a requirement for shifting gears may result in a wheel torque that may be different than a desired wheel torque for maintaining the vehicle side-slip. Furthermore, US Patent Application No. 2018/0257631 does not disclose how a speed of one torque source can be manipulated while not connected to driven wheels while another torque source continues to provide torque to driven wheels in response to a request to induce vehicle side slip.

Thus, the inventors herein have developed methods to at least partially address the above-mentioned issues. In one example, a method for inducing vehicle side slip comprises opening a sole driveline disconnect clutch positioned between an engine and an electric machine upstream of a transmission, and closing the open sole driveline disconnect clutch within a predetermined amount of time after opening the sole driveline disconnect clutch without shifting gears of the transmission in response to a request to induce vehicle side slip. In this way, vehicle side slip may be induced in a hybrid electric vehicle without changing transmission gearing. A benefit of not shifting gears may be that the presently engaged gear may more closely provide a desired wheel torque to maintain the vehicle side slip. In addition, it may be possible to maintain the vehicle's present speed.

As one example, with the engine disconnected from the driveline, engine speed may be raised during the predetermined amount of time. Raising engine speed may encourage driven wheel slip at the time when the driveline disconnect clutch is commanded closed. In addition, increasing the engine speed may increase the engine's torque capacity as compared to when the engine is operated at a lower speed. Furthermore, during the predetermined amount of time a torque output from the electric machine may be controlled to maintain vehicle speed. In this way, the possibility of inducing vehicle side slip may be improved in a hybrid electric vehicle with a driveline disconnect clutch positioned between an engine and an electric machine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an example table depicting a number of different scenarios whereby vehicle side-slip can be induced for a hybrid vehicle with an automatic transmission.

DETAILED DESCRIPTION

Figure 1:
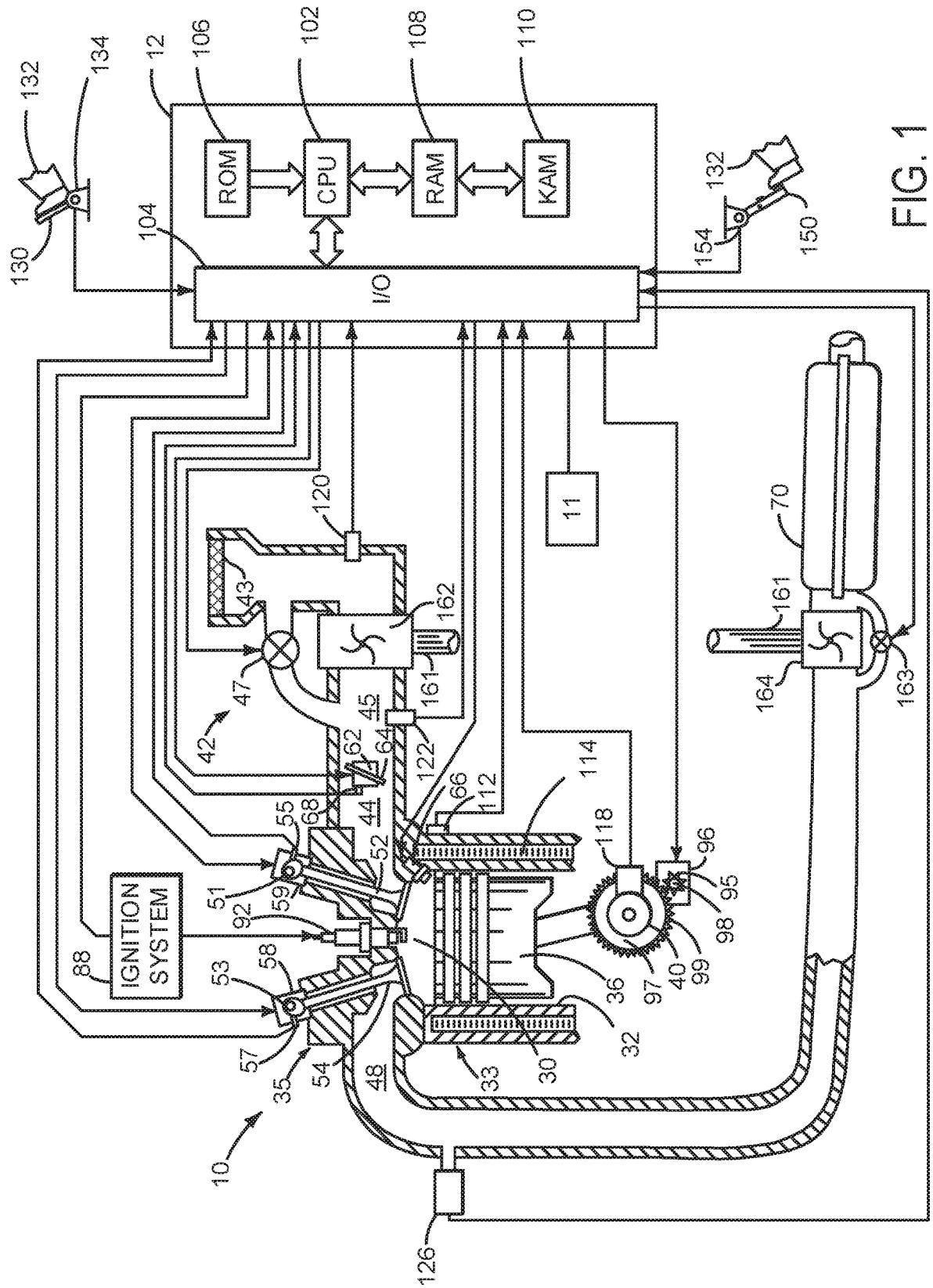
FIG. 1 is a schematic diagram of an engine.
Figure 2:
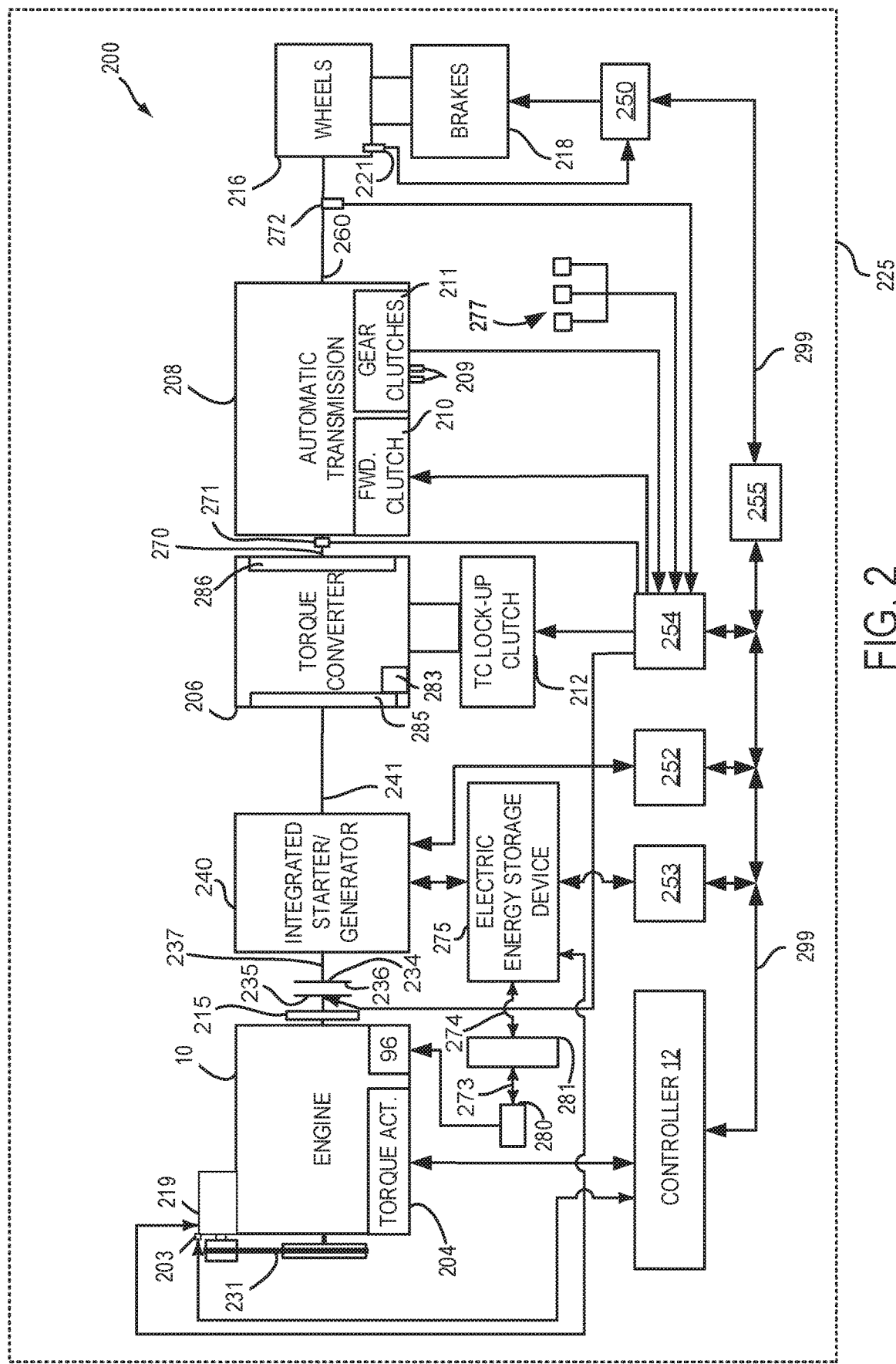
FIG. 2 is a schematic diagram of a hybrid vehicle driveline.
Figure 3:
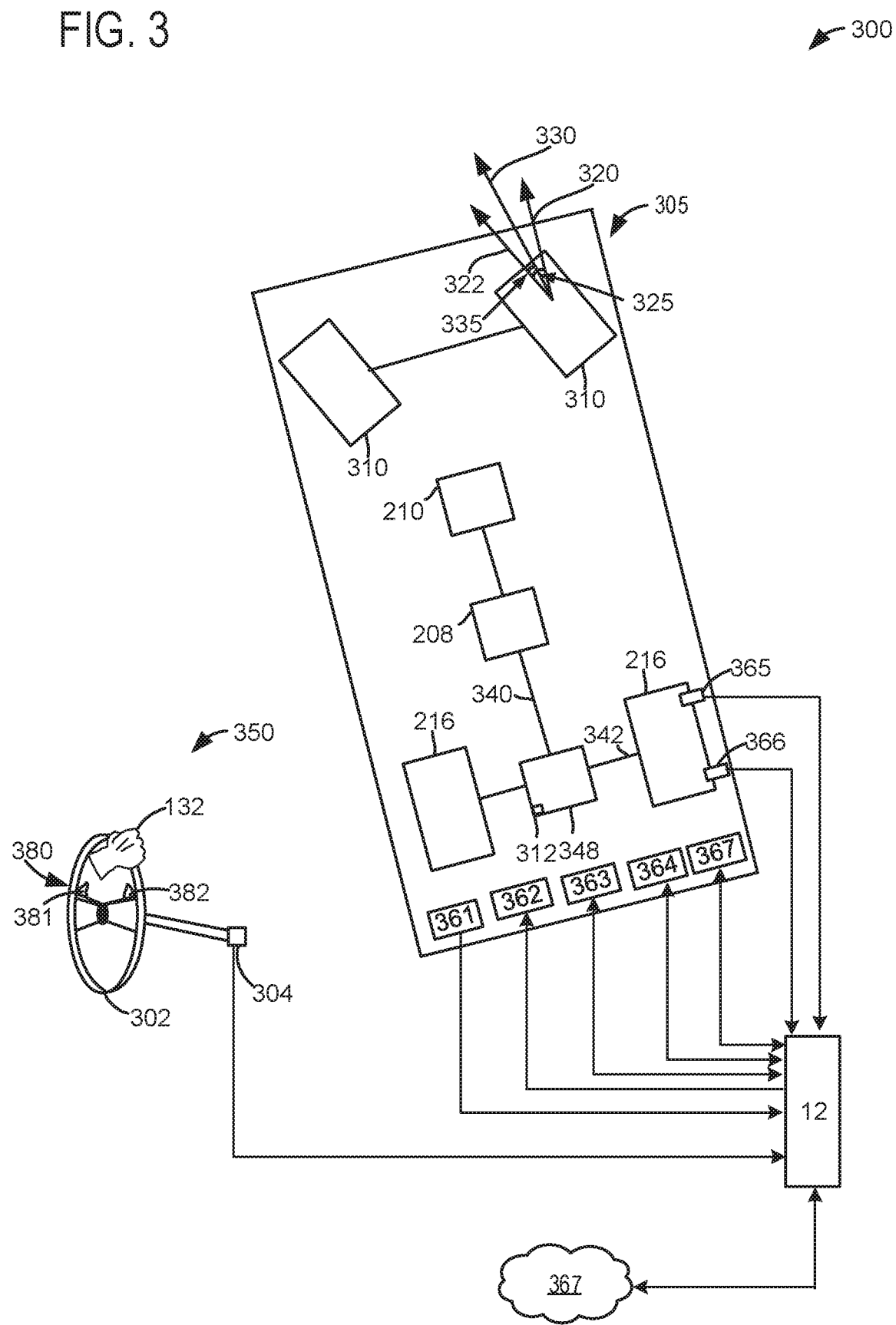
FIG. 3 is a sketch that shows a vehicle with a plurality of vehicle components and depicting a vehicle understeer angle.

The following description relates to systems and methods for inducing vehicle side slip or drift in a hybrid electric vehicle that includes a driveline disconnect clutch (DC clutch) positioned between an engine and an electric machine, a torque converter with a torque converter lock-up clutch (TC lock-up clutch) positioned between the electric machine and an automatic transmission, and driven rear wheels positioned downstream of the automatic transmission. However, it may be understood that methodology included herein may in some examples be applicable to a non-hybrid electric vehicle that includes at least an engine and a torque converter with a torque converter lock-up clutch, as will be discussed in further detail below. Accordingly, FIG. 1 shows an example depiction of an engine of the present disclosure. FIG. 2 depicts a schematic diagram of the driveline that includes the components discussed above positioned along the driveline as discussed. The process of initiating vehicle drift may begin when certain preconditions are met. In one example, preconditions may be met when a drift mode has been selected and where an understeer angle is greater than a threshold understeer angle for greater than a threshold duration. In another example, preconditions may be met when the drift mode has been selected and where predetermined input via a human driver is received at a controller. As examples, actuation (e.g. depression) of two transmission paddle shifters for a predetermined time period may communicate to the controller a desire for inducing vehicle drift. In another example, an accelerator pedal blip (e.g. rapid request for throttle opening) may communicate to the controller a desire for inducing drift. In yet another example, a particular pushbutton may be used for communicating to the controller a desire for inducing drift. As yet another example, a human driver may vocally issue a request to induce vehicle drift, which may be received via a microphone and communicated to the controller. In the above examples, such a request may additionally include the understeer angle being greater than the threshold understeer angle for greater than the threshold duration, whereas other examples may not. Accordingly, as an example, FIG. 3 depicts an illustration of a vehicle and an understeer angle, as well as a steering wheel with two transmission paddle shifters.

Figure 4:
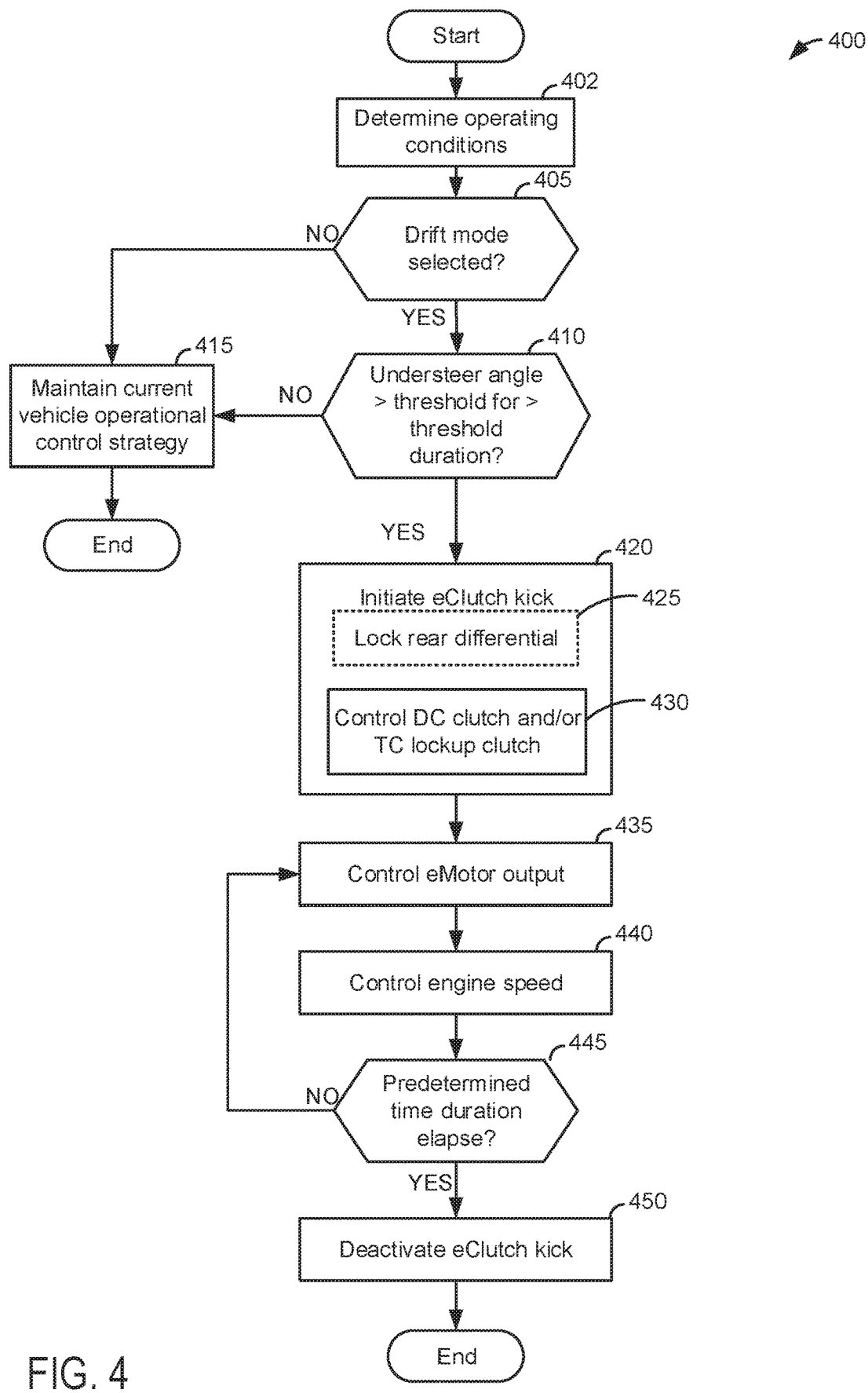
FIG. 4 shows a high-level flowchart for a method for inducing vehicle side-slip in a hybrid electric vehicle with an automatic transmission.
Figure 6:
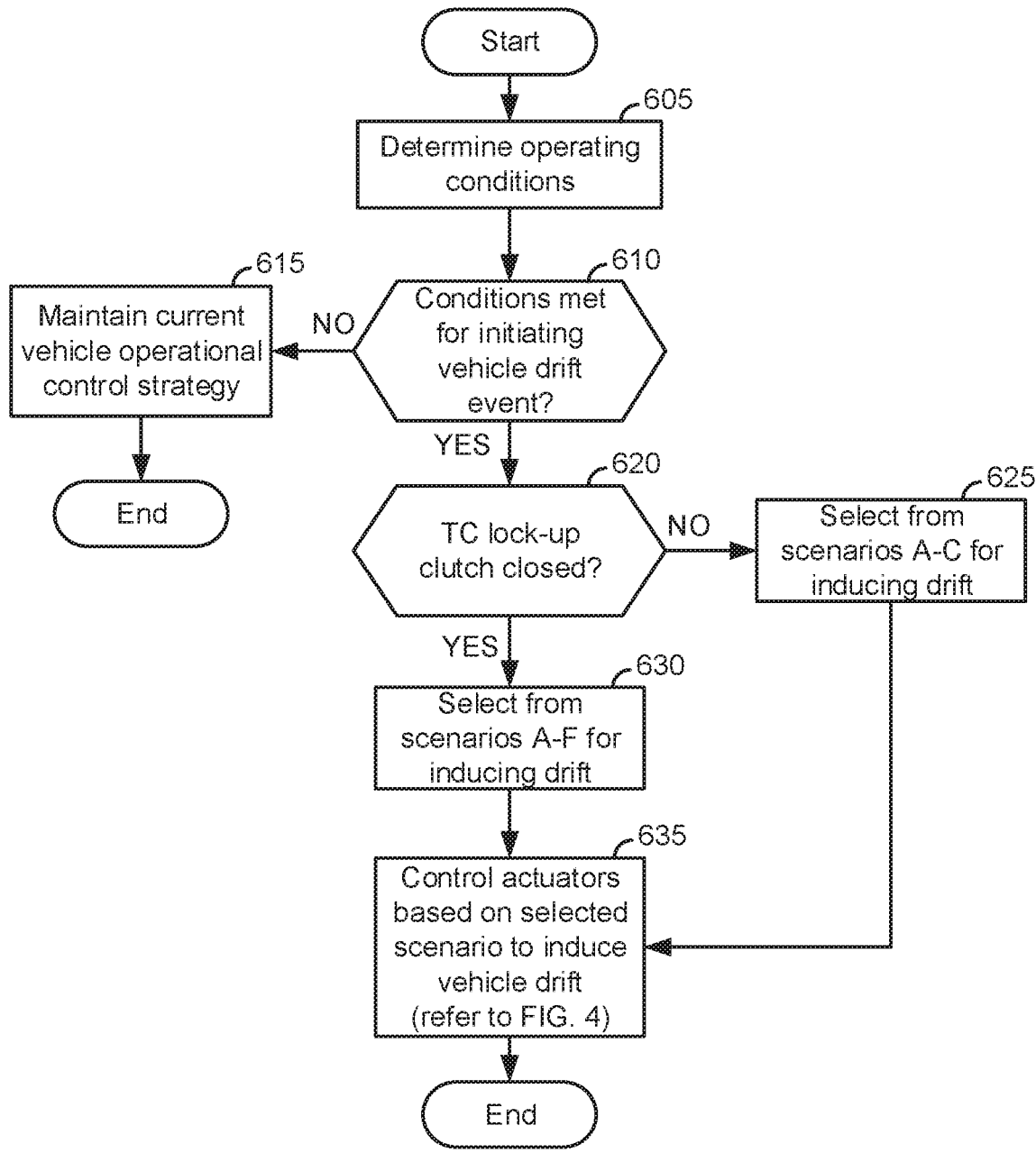
FIG. 6 shows a high-level flowchart for a method for selecting which scenario to use to induce vehicle side-slip, from the plurality of scenarios depicted at the table of FIG. 5.

A number of different scenarios or methodologies may be used to induce vehicle drift as discussed herein. Thus, FIG. 4 depicts a high level example method broadly outlining steps of the present disclosure which may be taken to induce vehicle drift. Such methodology may include controlling actuators including but not limited to the DC clutch, the TC lock-up clutch, the engine, the electric machine, etc. FIG. 5 depicts a table illustrating a number of different ways in which vehicle drift may be induced, and how the above-mentioned actuators are controlled for each different option. As there are a number of different options for inducing drift, FIG. 6 depicts a high-level example method that broadly outlines the steps of selecting an option for inducing vehicle drift. FIGS. 7-12 each depict timelines corresponding to the individual options or scenarios by which vehicle drift may be induced, corresponding to the different options of Table 5 and in line with the general overall methodology of FIG. 4.

Referring now to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-2 and employs the actuators shown in FIGS. 1-2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. As one example, a drift induce pushbutton may be included that, when depressed may communicate the controller 12 of a desire via the driver to induce vehicle drift or side-slip.

In some examples, controller 12 may receive input from a microphone 13. Microphone 13 may be placed in a vehicle that includes engine 10, and may be configured to receive input from a human driver of such a vehicle. In one example, the microphone may be used to communicate a voice command via a human driver to the controller such that one or more actuators may be controlled to induce a vehicle drift maneuver.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed decreasing, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, discussed herein, the systems and methods may be applicable to a vehicle that includes a DC clutch positioned in a driveline between an engine and an electric machine, along with a torque converter that includes a TC lock-up clutch positioned between the electric machine and the automatic transmission. However, it may be understood that in some examples the systems and methods discussed herein may be applicable to vehicles that include the automatic transmission and the torque converter with TC lock-up clutch, but not the DC clutch, as will be discussed in further detail below.

Turning now to FIG. 3, an illustration 300 is depicted showing a steering angle and an angular difference between steering angle and an actual vehicle direction of travel. The angular difference between steering angle and the actual vehicle direction of travel is referred to herein as an understeer angle. The understeer angle may be used as discussed herein to infer when to initiate a vehicle drift maneuver. Alternatively, simultaneous depression of two transmission paddle shifters may be used as discussed herein to infer when to initiate a vehicle drift maneuver.

Illustration 300 includes vehicle 305 having front wheels 310 and rear wheels 216. Front wheels 310 are pointed left so that the vehicle can negotiate a left turn. Arrow 320 indicates a direction of front wheels when the vehicle is directed in a straight line, or in other words, is not negotiating a turn. Arrow 322 indicates the way the wheels are presently pointing to negotiate the left turn. An angular difference between arrow 320 and arrow 322 is referred to herein as steering angle 325. Turning to inset 350, steering wheel 302 may be rotated via a human driver 132 or via an autonomous driver (not shown). The controller (e.g. controller 12 at FIG. 1) may receive input from steering angle sensor 304 for determining steering angle 325.

Also depicted is arrow 330. Arrow 330 depicts an actual vehicle direction. An angular difference between the actual vehicle direction (arrow 330) and steering angle 325 is referred to as the understeer angle 335. As mentioned, understeer angle 335 may be used to infer when to initiate a vehicle drift maneuver. In one example, vehicle direction may be determined in conjunction with the onboard navigation system. For example, actual vehicle direction may be determined based on a navigation compass vector direction.

Vehicle 305 may include rear drive shaft 340, and rear axle shaft 342. Depicted for reference is engine 10 and transmission 208. Vehicle 305 may include rear differential 348. Rear differential 348 may include a rear differential actuator 312 which may receive an electric control signal from the controller of the vehicle, which may command the rear differential to a locked or unlocked configuration. When commanded to the locked configuration both rear wheels rotate at the same speed (but may have unequal torque). Alternatively, when in the unlocked configuration, both rear wheels may rotate at different speeds (but equal torque). In one example, the rear differential may be an electronic limited slip differential (eLSD) where the controller may actively regulate an amount of torque distributed to rear wheels 216.

Also depicted at FIG. 3 are paddle shifters 380. Paddle shifters may enable a human driver to manually shift gears of the automatic transmission (e.g. automatic transmission 208 at FIG. 2). Specifically, first paddle 381 shifts the automatic transmission up a gear, while second paddle 382 shifts the transmission down a gear. In some examples, the paddle shifters may be utilized as a means of initiating a drift maneuver, discussed in further detail below.

Vehicle 305 may further include ambient temperature sensor/humidity sensor 361, one or more onboard camera(s) 362, and one or more IR camera(s) 363. The one or more onboard cameras may in some examples be used to capture images of a surface of the road the vehicle is traveling on, where such images may be communicated to the controller and processed via an algorithm that determines a type of road surface the vehicle is traveling on (e.g. asphalt, concrete, dirt, grass, etc.). The one or more IR camera(s) may in some examples be used to infer a temperature of the road surface the vehicle is traveling on. Such information may be taken into account for controlling a vehicle drift event, discussed in further detail below.

Vehicle 305 may further include an on-board navigation system 364 (for example, a Global Positioning System) that an operator of the vehicle (or autonomous controller) may interact with. The navigation system 364 may include one or more location sensors for assisting in estimating vehicle speed, vehicle altitude, vehicle position/location, vehicle direction of travel, etc. Information received from the GPS may be cross-referenced to information available via the internet to determine local weather conditions, local vehicle regulations, etc. Thus, controller 12 may be communicatively coupled to network 367. In one example network 367 is the pubic internet.

Vehicle 305 may include one or more tire pressure sensor(s) 365 and one or more tire temperature sensor(s) 366. Information from such sensors may be communicated to the vehicle controller, and such information may be used in the methodologies discussed herein for controlling vehicle drift maneuvers.

Vehicle 305 may also include inertial sensors 367. Inertial sensors 367 may comprise one or more of the following: longitudinal, latitudinal, vertical, yaw, roll, and pitch sensors.

Thus, discussed herein, a system for a hybrid electric vehicle may comprise a driveline disconnect clutch positioned between an engine and an electric machine, and a torque converter including a lock-up clutch positioned between the electric machine and an automatic transmission. The system may further include a controller with computer readable instructions stored on non-transitory memory that when executed, cause the controller to receive a request to induce a vehicle side-slip, command open one or more of the driveline disconnect clutch and the lock-up clutch and in response, control an engine speed and an electric machine speed, and command closed one or more of the driveline disconnect clutch and the lock-up clutch in response to the request to induce the vehicle side-slip after a predetermined amount of time has elapsed since commanding open one or more of the driveline disconnect clutch and the lock-up clutch.

For such a system, the request to induce the vehicle side-slip may include a particular mode of vehicle operation having been preselected and one or more of an indication of an understeer angle being greater than a threshold understeer angle for greater than a threshold duration, and an indication that a first paddle shifter and a second paddle shifter for changing transmission gearing have both been depressed for greater than a predetermined time threshold.

Such a system may further comprise a rear differential. In such an example, the controller may store further instructions to lock the rear differential in response to commanding open one or more of the driveline disconnect clutch and the lock-up clutch.

For such a system, the controller may store further instructions to maintain a current gear of the automatic transmission between commanding open and commanding closed one or more of the driveline disconnect clutch and the lock-up clutch.

Turning now to FIG. 4, a high-level example method 400 is shown for inducing vehicle side-slip under predetermined conditions where a drift mode of operation has been selected by a human or autonomous driver. Method 400 will be described with reference to the systems described herein and shown in FIGS. 1-3, though it may be appreciated that similar methods may be applied to other systems without departing from the scope of this disclosure. Instructions for carrying out method 400 and the rest of the methods included herein may be executed by a controller, such as controller 12 of FIG. 1, based on instructions stored in non-transitory memory, and in conjunction with signals received from sensors of the engine system, such as temperature sensors, pressure sensors, and other sensors described in FIGS. 1-3. The controller may employ actuators such as the electric machine (e.g. electric machine 240 at FIG. 2), the disconnect clutch (DC clutch) (e.g. DC clutch 236 at FIG. 2), the torque converter lock-up clutch (TC lock-up clutch) (e.g. TC lock-up clutch 212 at FIG. 2), electronic throttle (e.g. throttle 62 at FIG. 1), etc., to alter states of devices in the physical world.

Method 400 begins at 402 and includes determining current vehicle operating conditions. Current operating conditions may include but are not limited to engine speed, BISG torque, electric machine torque, driver demand torque, engine load, ambient temperature, ambient pressure, vehicle speed, etc. Method 400 then proceeds to 405.

At 405, method 400 judges if drift mode has been selected by a human or autonomous driver. Drift mode may be an option that the driver may select, for example, via input into a human machine interface (HMI) positioned at a dashboard of the vehicle. Additionally or alternatively, the driver may select the drift mode option via input into a remote computing device (e.g. smartphone, laptop, tablet, desktop computer, etc.) running an application which communicates the drift mode selection to the controller of the vehicle. If, at 405, drift mode has not been selected then method 400 proceeds to 415. At 415, method 400 includes maintaining current vehicle operational control strategy with regard to various driving scenarios, without inducing vehicle drift even if conditions are encountered where vehicle drift may be possible. In other words, the DC clutch and/or the TC lock-up clutch may not be controlled to induce vehicle drift even under circumstances where doing so may induce vehicle drift. Method 400 may then end.

Returning to 405, under circumstances where drift mode has been selected via the human or autonomous driver, method 400 may proceed to 410. At 410, method 400 may include determining whether the understeer angle is greater than a threshold for a threshold period of time. If not, then method 400 may proceed to 415, where current vehicle operational control strategy may continue, without manipulation of the DC clutch and/or TC lock-up clutch. In other words, the controller may not implement any strategy to induce vehicle drift under circumstances where the understeer angle is not greater than the threshold angle for greater than the threshold time duration, in one example. Method 400 may then end.

It may be understood that such a requirement for understeer angle greater than the threshold for the threshold period of time may be a requirement in some examples but not in others. For example, there may be other examples where a driver may communicate to the controller a desire to induce vehicle drift in a manner that is independent of (or additionally dependent on) understeer angle. For example, one of simultaneous depression of transmission paddle shifters, vocal communication from a human driver, or depression of a dedicated pushbutton may be used to communicate to the controller a request for inducing vehicle side-slip.

Thus, while not specifically illustrated at method 400, in another example the query at 410 may be different. Specifically, in addition or alternative to determining whether understeer angle is greater than the threshold for greater than the predetermined amount of time, it may be determined as to whether both the first paddle shifter and the second paddle shifter (e.g. first paddle shifter 381 and second paddle shifter 382) have both been simultaneously depressed for a predetermined period of time, whether the controller has received a vocal request for inducing side-slip, whether a dedicated pushbutton has been depressed, whether an accelerator pedal blip has been conducted, etc. If not, then method 400 may proceed to 415 similar to that discussed above.

Returning to 410, in response to the understeer angle being greater than the threshold angle for greater than the threshold time duration (or in response to both the paddle shifters being simultaneously depressed for the predetermined period of time, for example), method 400 proceeds to 420. At 420, method 400 includes initiating an electronic clutch kick (eClutch kick) via electronically controlling one or more clutches (e.g. DC clutch and/or TC lock-up clutch) included in the vehicle driveline. In other words, the eClutch kick is induced via the controller controlling a state of the one or more clutches, rather than a driver performing a manual manipulation of a clutch to induce drift. In some examples at 425, initiation of the eClutch kick may include the controller commanding the rear differential (e.g. rear differential 348 at FIG. 3) to a locked configuration so as to prevent just one wheel from spinning. However, in other examples initiation of the eClutch kick may not include locking the rear differential. Furthermore, as discussed above, in some examples the rear differential may be an eLSD. In such an example, the controller may effectively allocate torque to individual wheels in order to prevent just one wheel from taking all the system torque. Because step 425 may or may not be conducted, box 425 is depicted as a dashed line.

At 430, method 400 includes controlling one or more of the DC clutch and the TC lock-up clutch. There may be a number of different ways in which the DC clutch and/or the TC lock-up clutch may be controlled, the details of which will be elaborated in further detail below with regard to FIG. 5 and the timelines of FIGS. 7-12. Broadly stated however, initiating the eClutch kick sequence may include one or more of commanding fully open the DC clutch and commanding fully open the TC lock-up clutch. Discussed herein, commanding clutches (e.g. DC clutch and/or TC lock-up clutch) fully open may refer to commanding the respective clutches open 100%. However, it may be understood that in other examples, commanding open the clutches may include commanding clutches to a slip amount greater than a slip threshold. For example, a clutch that is slipping >90%, or greater than 95% may be referred to as an open clutch. It may be understood that commanding open the TC lock-up clutch may be an option when the TC lock-up clutch is locked at the time of eClutch kick initiation, but not if the TC lock-up clutch is open. As one example, by commanding fully open the DC disconnect clutch, the engine may be removed as a source of torque to the driven rear wheels, which may enable engine speed to increase such that when the DC clutch is subsequently closed, the increased torque provided to the driven rear wheels via the raised engine speed (and in some examples electric machine torque) may allow for the rear wheels to break traction with the road surface and spin freely so that the vehicle may undergo side-slip.

With the one or more clutches controlled at 430, method 400 may proceed to 435. At 435, method 400 includes controlling a torque output of the electric machine (e.g. electric machine 240). There may be a number of different ways in which the electric machine may be controlled at 435 depending on which clutch or clutches are commanded fully open for eClutch kick initiation, as will be elaborated in greater detail below. Broadly stated however, controlling the electric machine may include one of 1) discontinuing or maintaining discontinued any electric machine torque in response to eClutch kick initiation, 2) providing a variable amount of electric machine torque, 3) providing an amount of electric machine torque requested at the time of the eClutch kick event, 4) raising a torque output of the electric machine during the eClutch kick event, 5) controlling the electric machine to speed match the engine, or 6) controlling the electric machine to a different speed than the engine speed (where the electric machine speed may be greater than or less than the engine speed). The manner in which the electric machine is controlled may be dependent on one or more vehicle operating parameters or relevant conditions. For example, one or more of tire pressure, tire temperature, road surface type, road surface temperature, ambient temperature, vehicle speed, road surface conditions (e.g. wet, damp, etc.), etc., may be factored in when determining how to control the electric machine for inducing vehicle side slip. However, in a seventh example (7) as mentioned above, in examples where the vehicle does not include an electric machine (and is correspondingly without a DC clutch), then the TC lock-up clutch may be commanded fully open while continuing to deliver engine torque to the axle via a fully closed transmission gear clutch (e.g. 211), in response to a request to induce vehicle drift. Then, the vehicle side-slip may be realized via the commanding fully closed of the TC lock-up clutch. In other words, with a transmission gear clutch fully closed, the TC lock-up clutch may be commanded fully opened and then slammed closed in response to the request to initiate the drift, without changing the fully closed position of the transmission gear clutch. This may enable the continuing of providing torque to the axle and may further include enabling maintaining vehicle speed.

Proceeding to 440, method 400 may include controlling engine speed. Specifically, with the eClutch kick initiated the human driver may press down on the accelerator pedal to a desired level to raise engine speed to a driver-determined desired speed. In a case where the vehicle is operated via an autonomous driver, engine speed may be controlled via electronic manipulation of the intake throttle (e.g. intake throttle 62 at FIG. 1). In another example, the increase in engine speed may be automatically controlled even in the case where a human driver is present. For example, electronic manipulation of the intake throttle may be under control or at least partial control of the controller for controlling engine speed under conditions where a human driver is operating the vehicle.

As discussed above, raising the engine speed may result in increased torque sufficient to induce the rear wheels to slip in response to again connecting the engine to the driveline and to the driven rear wheels, in a case where initiating the eClutch kick involved disconnecting the engine from the driveline. Similar to that discussed above for the electric machine control, one or more of tire pressure, tire temperature, road surface type, road surface temperature, ambient temperature, vehicle speed, road surface conditions (e.g. wet, damp, etc.) may be factored in when determining how to control the engine for inducing vehicle side slip.

Proceeding to 445, method 400 includes determining if a predetermined time duration has elapsed since the initiation of the eClutch kick. The predetermined time duration at 445 may in some examples be a variable time duration. For example, the predetermined time duration may be variable as a function of one or more of tire pressure, tire temperature, road surface, ambient temperature, vehicle speed, engine speed, electric machine speed, etc. For example, the controller may in some examples allocate a greater amount of time after initiation of the eClutch kick for the engine speed and/or electric machine speed to be controlled under conditions where it may be more difficult to initiate wheel slip for the drift, as compared to conditions where achieving wheel slip is easier. As an example, tire pressure below a predetermined threshold tire pressure and a road surface with a particular coefficient of friction that is above a threshold coefficient of friction may make it more difficult for a spinning tire to brake traction from the road. In such an example, the predetermined time may be increased, as compared to another example where the coefficient of friction is below the threshold coefficient of friction and where tire pressure is greater than the threshold tire pressure.

In an additional or alternative example, while not specifically illustrated at FIG. 4, it may be understood that decision block 445 may output a "yes" based on speed of a propulsion source (e.g. engine, electric machine) being within a threshold speed of a determined speed for the particular propulsion source. For example, block 445 may output a "yes" in response to engine speed being within a threshold engine speed of a determined engine speed. In another example, block 445 may output a "yes" in response to electric machine speed being within a threshold electric machine speed of a determined electric machine speed. In another example, block 445 may output a "yes" in response to both the electric machine speed being within a threshold electric machine speed of the determined electric machine speed and the engine speed being within the threshold engine speed of the determined engine speed. The determined engine speed and/or determined electric machine speed may be determined via the controller, for example, based on vehicle operating conditions including but not limited to vehicle speed, engine and/or electric machine load, vehicle weight, understeer angle, road temperature, road type, inferred road coefficient of friction, etc.

If, at 445 it is determined that the predetermined time duration has not elapsed (or that the speed of the propulsion source(s) are not yet within a threshold of the desired speed), then method 400 may return to 435 where electric machine output and/or engine speed may continue to be controlled. Alternatively, method 400 may proceed to 450.

At 450, method 400 includes deactivating the eClutch kick to induce the vehicle side-slip or drift. Deactivating the eClutch kick may include one or more of commanding the DC clutch fully closed and the TC lock-up clutch fully closed. For example, in a case where the DC clutch was commanded fully open at step 420 but where a status of the TC lock-up clutch was not changed, then at 445 method 400 may include commanding fully closed the DC clutch. In another example where the TC lock-up clutch was commanded fully open at step 420 and where the DC clutch was maintained fully closed, then at 445 method 400 may include commanding fully closed the TC lock-up clutch. However, in some examples where both the DC clutch and the TC lock-up clutch were commanded fully open at step 420, then both the DC clutch and the TC lock-up clutch may be commanded fully closed at 445. In some examples where both the DC clutch and the TC lock-up clutch were commanded fully open at step 420, the DC clutch may be commanded fully closed just before (e.g. within another predetermined duration of) fully closing the TC lock-up clutch. Alternatively, the TC lock-up clutch may be commanded fully closed just before (e.g. within yet another predetermined duration of) fully closing the DC clutch. Examples of the above methodology will be provided in greater detail below.

As discussed above, whether the DC clutch is fully closed and/or the TC lock-up clutch is fully closed is a function of how the eClutch kick was initiated in the first place. Thus, deactivating the eClutch kick may result in an increased torque to the driven wheels sufficient to induce wheel slip thereby enabling the desired vehicle drift or side-slip maneuver.

Accordingly, method 400 broadly describes methodology for inducing vehicle drift via controlling one or more of the DC clutch and the TC lock-up clutch when conditions are met for doing so. As discussed above, there may be a number of different implementations of the above-described broad methodology, discussed in detail with regard to FIG. 5 and the timelines of FIGS. 7-12.

For facilitating discussion of the different options for inducing vehicle drift by the general methodology of FIG. 4, FIG. 5 depicts table 500 showing six different scenarios or options (A-F) for control methodology, each of which will be discussed in detail. Table 500 organizes the actions corresponding to the DC clutch (e.g. DC clutch 236 at FIG. 2), TC lock-up clutch (e.g. TC lock-up clutch 212 at FIG. 2), engine speed, and electric machine output (either torque or speed, discussed below) for initiating vehicle drift. It may be understood as will be elaborated below that control of engine speed and electric machine torque/speed refers to control in response to the eClutch kick being initiated via one or more of fully opening the DC clutch and/or the TC lock-up clutch. In other words, control of engine speed and electric machine speed as per table 500 occurs between when the DC clutch and/or TC lock-up clutch fully opens and when the DC clutch and/or TC lock-up clutch fully closes. Furthermore, with regard to the below-discussion it may be understood that conditions being met for initiating the eClutch kick for each scenario include the drift mode being activated and either the understeering angle being greater than the threshold for greater than the threshold duration, or both paddle shifters being simultaneously held down for greater than the predetermined amount of time (or the drift inducing pushbutton being depressed, the controller receiving a vocal request to initiate drift, an accelerator pedal blip, etc.). In other words, conditions are inferred to be met when the answer to the query at step 410 of method 400 is "yes".

Beginning with scenario A, in response to conditions being met for initiating an eClutch kick, the DC clutch is commanded fully open via the controller. With the DC clutch commanded open, the human or autonomous driver may increase engine speed (e.g. via depressing the accelerator pedal and/or via the controller commanding position of the electronic intake throttle in the case of a human driver, or electronic control of the throttle in the case of an autonomous driver). In this scenario A, the TC lock-up clutch can be either open or fully closed. Regardless of whether the TC lock-up clutch is open or closed, no further control is exerted over the state of the TC lock-up clutch. Prior to conditions being met for initiating the eClutch kick, the electric machine may be operating to provide output torque to the driven rear wheels. However, responsive to the eClutch kick being initiated the electric machine may be commanded to cease providing output torque to the driven rear wheels.

After the predetermined time duration that defines the eClutch kick sequence (opening the selected clutch or clutches and then closing the selected clutch or clutches) elapses (or in response to one or more propulsion source speeds within threshold(s) of desired speed(s)), the DC clutch is commanded fully closed. Commanding fully closed the DC clutch connects the engine to the driveline and to the driven rear wheels. In one example, in a case where the electric machine was providing torque to the driven rear wheels prior to the eClutch kick being initiated (and then stopped while the DC clutch was open), the electric machine speed may be ramped up again at the time of the closing of the DC clutch to provide the equivalent amount of torque it was providing prior to the initiation of the eClutch kick initiation. However, in some examples the electric machine may be controlled to transfer a different amount (e.g. greater or lesser) then the amount of torque the electric machine was providing prior to the initiation of the eClutch kick without departing from the scope of this disclosure. For example, under circumstances where DC clutch capacity is available to carry full engine torque, the maximum torque (per driver demand) may be applied. It may be understood that driver demand would not be exceeded, for example in a case where driver demand is 300 N-m and the engine output is 250 N-m, then the electric machine may be controlled to rapidly produce 50 N-m to meet the driver demand at the time of closing the DC clutch. Upon fully closing the DC clutch the combination of engine torque and electric machine torque transferred to the driven rear wheels causes the rear wheels to break traction with the road surface and thus cause the desired vehicle side-slip.

Similar to scenario A, scenario B includes controlling the DC clutch to initiate the eClutch kick event while not changing the current status of the TC lock-up clutch. However, the difference between scenario A and scenario B is that after initiation of the eClutch kick via commanding fully open the DC clutch, a variable amount of electric motor torque may continue to be provided to the driveline Continuing to provide a variable amount of electric motor torque may be advantageous in that a target wheel speed may be maintained throughout the eClutch kick event. Specifically, electric machine torque output may be varied in order to maintain the target wheel speed. Similar to that discussed with regard to scenario A, the TC lock-up clutch may be either open or fully closed at the time of eClutch kick initiation, and as discussed no further control is exerted over the TC lock-up clutch after the eClutch kicks sequence initiation.

Thus briefly, scenario B involves commanding fully open the DC clutch in response to conditions being met for initiating the eClutch kick, without modifying the status of the TC lock-up clutch, regardless of whether the TC lock-up clutch is open or fully closed. With the DC clutch fully open, the human or autonomous driver increases engine speed and the electric machine is controlled to transfer a variable amount of torque to the driven rear wheels to maintain a desired or target wheel speed.

After the predetermined time duration that defines the eClutch kick sequence (opening the selected clutch or clutches and then closing the selected clutch or clutches) elapses, the DC clutch is commanded fully closed, which connects the engine to the driveline and to the driven wheels. The electric machine may continue to provide torque to the driven rear wheels at a level corresponding to the torque being provided at the time of the DC clutch being closed, or a greater or lesser level. Upon fully closing the DC clutch the combination of engine torque and electric machine torque transferred to the driven rear wheels may cause the rear wheels to break traction with the road surface and thus result in the desired vehicle side-slip. Thus, scenario B may result in behavior where there is not an appreciable loss of torque output during the eClutch kick event. Accordingly, for scenario B a human driver may not experience a loss of torque output during the eClutch kick event. This may provide the advantage of maintaining vehicle speed before and while drift is being induced.

Scenario C is similar to scenario B except for the fact that the torque provided to driven rear wheels via the electric machine is held at a steady level during the eClutch kick event rather than being variable. The amount of torque provided to the driven wheels via the electric machine may be an amount requested at the initiation of the eClutch kick event. Similar to scenario A and scenario B above, for scenario C the TC lock-up clutch may be either open or fully closed.

Thus briefly, scenario C involves commanding fully open the DC clutch in response to conditions being met for initiating the eClutch kick, without modifying the status of the TC lock-up clutch. With the DC clutch fully open, the human or autonomous driver increases engine speed and the electric machine is controlled to transfer a steady amount of torque to the driven wheels, the amount of torque comprising an amount requested at the time of the eClutch kick initiation, or in other words, at the time of the commanding open the DC clutch.

After the predetermined time duration that defines the eClutch kick sequence (opening the selected clutch or clutches and then closing the selected clutch or clutches) elapses (or in response to one or more propulsion source speeds within threshold(s) of desired speed(s)), the DC clutch is commanded fully closed, thus connecting the engine to the driveline and to the driven wheels. The electric machine may continue to provide torque to the driven rear wheels. The amount of torque provided to the driven wheels via the electric machine may be greater than the amount provided during the eClutch kick sequence, less than the amount provided during the eClutch kick sequence, or the same as the amount provided during the eClutch kick sequence. Upon closing the DC clutch the combination of engine torque and electric machine torque transferred to the driven rear wheels may cause the rear wheels to break traction with the road surface and thus result in the desired vehicle side-slip. Thus, scenario C may result in behavior where there is not an appreciable loss of torque output during the eClutch kick event. Accordingly, for scenario C a human driver may not experience a loss of wheel torque output during the eClutch kick event.

Scenario D differs from the above scenarios A-C in that, rather than commanding open and then closed the DC clutch, the DC clutch is maintained closed and instead the TC lock-up clutch is commanded open and then closed as will be discussed below. Thus, scenario D involves a situation that is available when the TC lock-up clutch is in a locked configuration at the time when conditions are met for initiating the eClutch kick event. Thus, it may be understood that the DC clutch may not be necessary for this mode, or this mode may be used with the DC clutch is not present in the vehicle.

Briefly, scenario D involves responsive to conditions being met for initiating an eClutch kick, maintaining the DC clutch fully closed and commanding fully open the TC lock-up clutch. With the TC lock-up clutch commanded fully open, the human or autonomous driver may increase engine speed, and electric motor speed may be controlled to increase as well. Thus, such a scenario allows for raising both engine and motor speed while also providing torque multiplication during the eClutch kick event.

After the predetermined time duration that defines the eClutch kick sequence (opening the selected clutch or clutches and then fully closing the selected clutch or clutches) elapses (or in response to one or more propulsion source speeds within threshold(s) of desired speed(s)), the TC lock-up clutch is commanded fully closed which provides further impulse to the driveline provided the engine and motor speeds are greater than transmission input speed. Upon closing the TC lock-up clutch the further impulse to the driveline may induce the rear wheels to break traction with the road surface, thereby initiating the vehicle drift or side-slip. Thus, compared to scenarios A-C, scenario D allows for maintaining positive torque to the wheels via the engine, which may reduce a possibility for driveline braking prior to inducing side-slip. Advantages of the torque multiplication discussed with regard to scenario D includes providing a "softer" clutch kick. Scenario D provides a torque path from the engine and electric machine to the wheels to enable vehicle propulsion during the eClutch kick event, and may provide more yaw/rotation/oversteer at the end of the event by creating an additional impulse via the torque converter clutch.

Turning now to scenario E, it involves commanding fully open both the DC clutch and the TC lock-up clutch in response to conditions being met for initiating the eClutch kick. Specifically, in response to conditions being met for initiating an eClutch kick, the DC clutch and the TC lock-up clutch are commanded fully open at the same time. With the DC clutch commanded fully open, the engine is disconnected from the driveline, while the electric machine is still connected to the driveline via the open TC lock-up clutch. Thus, scenario E enables torque multiplication via the electric motor through the open torque converter, and further allows for increasing engine speed without the engine being connected to the driveline. As engine speed increases, scenario E involves the electric machine speed-matching the engine speed. It may be understood that matching the electric machine to the engine speed may be carried out by the controller, based on feedback pertaining to both engine speed and electric machine speed in relation to one another. As an example, just prior to closing the DC clutch, and then TC lock-up clutch, the engine and electric machine may be speed-matched. This provides the advantage of providing some amount of propulsion torque to the drive line while the engine is increasing speed. The engine and electric machine speeds may be synched just before closing the DC clutch, and a final impulse to the driveline may be provided via the closing of the TC lock-up clutch.

After the predetermined time duration that defines the eClutch kick sequence (opening the selected clutch or clutches and then closing the selected clutch or clutches) elapses (or in response to one or more propulsion source speeds within threshold(s) of desired speed(s)), the DC clutch is commanded fully closed and then shortly thereafter the TC lock-up clutch is commanded fully closed. The DC clutch may be fully closed within a predetermined duration of when the TC lock-up clutch is closed. In other words, the closing of the DC clutch and the TC lock-up clutch may not be simultaneously carried out, but instead the DC clutch may be fully closed slightly before the TC lock-up clutch is fully closed. Upon closing the DC clutch and the TC lock-up clutch the increase in torque supplied to the driveline via the engine and electric machine may cause the wheels to break traction with the road surface, thereby initiating the vehicle drift or side-slip.

Turning now to scenario F, it is similar to scenario E with the exception being that rather than commanding fully closed the DC clutch followed by commanding fully closed the TC lock-up clutch, the TC lock-up clutch may be commanded fully closed first, and then shortly thereafter the DC clutch may be commanded fully closed. Thus, similar to scenario E, in response to conditions being met for initiating the eClutch kick, the DC clutch and the TC lock-up clutch are both commanded open at the same time. With the DC clutch commanded fully open, the engine is disconnected from the driveline, while the electric machine is still connected to the driveline via the open TC lock-up clutch. Thus, similar to scenario E, scenario F enables torque multiplication via the electric machine through the open torque converter, and further allows for increasing engine speed without the engine being connected to the driveline. However, rather than the electric machine being commanded to speed-match the engine speed, the electric machine may be controlled to a higher or a lower speed than the engine speed. It may be understood that controlling speed of the electric machine may be under the controller, in conjunction with feedback from the engine related to engine speed and feedback from the electric machine pertaining to electric machine speed.

After the predetermined time duration that defines the eClutch kick sequence (opening the selected clutch or clutches and then closing the selected clutch or clutches) elapses (or in response to one or more propulsion source speeds within threshold(s) of desired speed(s)), TC lock-up clutch is commanded fully closed. With the TC lock-up clutch fully closed, engine speed may continue to increase. Subsequently, the DC clutch is commanded fully closed. The time between commanding the DC clutch fully closed after commanding fully closed the TC lock-up clutch may be a predetermined time frame. Thus, it may be understood that for scenario F, closing of the DC clutch and the TC lock-up clutch may not be simultaneously carried out, but instead the DC clutch may be closed after the TC lock-up clutch is closed. Upon fully closing the DC clutch subsequent to the TC lock-up clutch, the increase in torque supplied to the driveline via the engine and electric machine may cause the wheels to break traction with the road surface, thereby initiating the vehicle drift or side-slip.

For any of the above-mentioned scenarios, it may be understood that the driven wheels may be commanded to rotate at a same speed (e.g. rear axle locked via rear differential) in response to initiation of the eClutch kick event (e.g. in response to the DC clutch and/or the TC lock-up clutch being commanded open). In another example where the vehicle includes an electronic limited slip differential, the driven wheels may be allowed to rotate at different speeds but where a maximum difference may be limited to a predetermined difference.

Turning now to FIG. 6, a high-level example method 600 is shown for selecting how to conduct a vehicle drift event. Method 600 will be described with reference to the systems described herein and shown in FIGS. 1-3, though it may be appreciated that similar methods may be applied to other systems without departing from the scope of this disclosure. Instructions for carrying out method 600 and the rest of the methods included herein may be executed by a controller, such as controller 12 of FIG. 1, based on instructions stored in non-transitory memory, and in conjunction with signals received from sensors of the engine system, such as temperature sensors, pressure sensors, and other sensors described in FIGS. 1-3. The controller may employ actuators such as the electric machine (e.g. electric machine 240 at FIG. 2), the disconnect clutch (DC clutch) (e.g. DC clutch 236 at FIG. 2), the torque converter lock-up clutch (TC lock-up clutch) (e.g. TC lock-up clutch 212 at FIG. 2), electronic throttle (e.g. throttle 62 at FIG. 1), etc., to alter states of devices in the physical world.

Method 600 begins at 602 and includes determining current vehicle operating conditions. Current operating conditions may include but are not limited to engine speed, BISG torque, electric machine torque, driver demand torque, engine load, ambient temperature, ambient pressure, vehicle speed, etc. In some examples, determining operating conditions may include estimating a vehicle weight. As one example, estimating a vehicle weight may be based on output from seat load cells (not shown), and may further include the controller querying a lookup table that stores information pertaining to vehicle weight. Additionally or alternatively, a driver may input an estimated amount of additional weight included in the vehicle into a screen associated with the vehicle dashboard, which may be communicated to the controller, and similarly used in conjunction with the lookup table that stores information related to vehicle weight.

In some examples, determining operating conditions may include determining ambient temperature/ambient humidity (e.g. via ambient temperature/humidity sensor 361 at FIG. 3). Additionally or alternatively, determining operating conditions may include inferring a type of road surface the vehicle is traveling along. Inferring the type of road surface may in some examples be carried out via one or more of the onboard camera(s) (e.g. onboard cameras 362 at FIG. 3). The one or more onboard cameras may be commanded via the controller to acquire one or more images of the road surface, and the one or more images may be processed via instructions stored at the controller in order to infer what type of road (e.g. asphalt, concrete, gravel, dirt, etc.) the vehicle is traveling on. Additionally or alternatively, the onboard navigation system (e.g. onboard navigation system 364 at FIG. 3) may be relied upon to infer road surface. In some examples, information retrieved from the onboard navigation system (e.g. location coordinates) may be used in conjunction with communication between the controller and the internet in order to infer the type of road surface the vehicle is currently traveling along.

In some examples, determining operating conditions may include inferring a temperature of the road surface that the vehicle is currently traveling along. In some examples, inferring the temperature may be via one or more IR cameras (e.g. IR cameras 363 at FIG. 3), the one or more IR cameras commanded under control of the controller to acquire one or more images. The one or more images may be then processed via instructions stored at the controller in order to estimate road surface temperature. Such an estimate may take into account current ambient temperature, recent weather conditions, etc.

Determining operating conditions may include determining current, forecast and/or recent weather conditions. The weather conditions may be retrieved via the onboard navigation system and/or via communication between the controller and relevant internet web sites, for example. The weather conditions may enable the controller to infer whether the road surface is wet, presence or absence of ice, etc.

Determining operating conditions may include inferring tire pressure, for example via the one or more tire pressure sensor(s) (e.g. tire pressure sensors 365 at FIG. 3). Inferring tire pressure may include inferring tire pressure of tires associated with driven wheels and/or non-driven wheels. Determining operating conditions may in some examples include inferring tire temperature, for example via the one or more tire temperature sensor(s) (e.g. tire temperature sensors 366 at FIG. 3). Inferring tire temperature may include inferring tire temperature of tires associated with driven wheels and/or non-driven wheels.

It may be understood that operating conditions related to one or more of ambient temperature/humidity, presence or absence of road surface precipitation (e.g. water, ice, etc.), road surface type (e.g. concrete, gravel, asphalt, etc.), road surface temperature, tire pressure (e.g. driven and/or non-driven wheels), tire temperature (e.g. driven and/or non-driven wheels), vehicle weight, etc., may be used as inputs to the below-discussed methodology pertaining to selecting an appropriate operating scheme for carrying out the vehicle drifting event. Specifically, such operating conditions may relate to how effective a particular methodology (refer to FIG. 5 and timelines of FIGS. 7-12) may be in inducing vehicle drift. For example, under conditions where tire pressure is greater than a tire pressure threshold and it is determined that the vehicle is traveling along a gravel road, it may be relatively easy to induce wheel slip, as compared to a circumstance where tire pressure is below the threshold tire pressure and the vehicle is traveling along an asphalt road, for example. In such an example, scenario D may be sufficient for inducing drift, provided the TC lock-up clutch is closed. Alternatively, if the TC lock-up clutch is not closed, then one of the scenarios A-C may be selected. In some examples the selection may be based on maximizing fuel economy, or in other words, minimizing a fuel economy penalty for inducing the drift event. Thus, in a situation where it is easier to induce drift, a scenario may be chosen that limits energy usage for inducing the vehicle drift.

With operating conditions determined at 605, method 600 may proceed to 610. At 610, method 600 may include indicating whether conditions are met for initiating a vehicle drift event. Conditions being met may include the drift mode having been preselected via the human or autonomous driver. Conditions being met may additionally include an indication that the understeer angle is greater than the threshold understeer angle for greater than the threshold duration (refer to step 410 of method 400). Additionally or alternatively, conditions being met may include an indication that both the first and the second paddle shifters have been depressed for the predetermined amount of time. In some examples, conditions being met may include one of a drift inducing pushbutton being depressed, the controller receiving an audible request to initiate drift from a driver of the vehicle, an accelerator pedal blip, etc. Furthermore, conditions being met may include a vehicle speed greater than a threshold vehicle speed. The threshold vehicle speed may be a vehicle speed where drift may not be feasible when the vehicle speed is not greater than the threshold vehicle speed.

If, at 610, conditions are not indicated to be met for initiating the vehicle drift maneuver, method 600 may proceed to 615. At 615, method 600 may include maintaining current vehicle operational strategy without taking any action to induce vehicle drift. Specifically, the DC clutch (e.g. DC clutch 236 at FIG. 2) may be controlled based on current operating conditions and may not be controlled in a manner so as to induce vehicle drift, and the TC lock-up clutch (e.g. TC lock-up clutch 212 at FIG. 2) may be controlled based on current operating conditions and may not be controlled in a manner so as to induce vehicle drift. Current engine speed and electric motor output may be controlled based on current operating conditions, and may not be controlled in a manner to induce vehicle drift. Method 600 may then end.

Returning to 610, in response to conditions being indicated to be met for initiating vehicle drift, method 600 proceeds to 620. At 620, method 600 includes determining whether the TC lock-up clutch is in a fully closed configuration. In other words, method 600 judges whether the TC lock-up clutch is locked at 620. If not, then method 600 proceeds to 625 and includes selecting between scenarios A-C (refer to FIG. 5) for conducting the vehicle drift event. More specifically, scenarios D-F discussed at FIG. 5 all include commanding open the TC lock-up clutch, which is possible when the TC lock-up clutch is locked at the time when conditions are indicated to be met for inducing vehicle drift, but not under circumstances where the TC lock-up clutch is already open. Accordingly, at 625, method 600 includes selecting whether the most appropriate manner in which to induce drift may be via scenario A, scenario B, or scenario C. As discussed above, the main differences between scenario A, scenario B and scenario C is the manner in which the electric machine is controlled subsequent to commanding open the DC clutch. Specifically, scenario A involves no torque output from the electric machine subsequent to commanding open the DC clutch, scenario B involves variable torque output from the electric machine subsequent to commanding open the DC clutch, and scenario C involves commanding the electric machine to produce a steady amount of torque requested at the time of commanding open the DC clutch, and then to hold the steady amount of torque until the DC clutch is commanded closed to induce the vehicle drift. Thus, selecting between such scenarios A-C may include factoring in the variables described above pertaining to tire pressure, tire temperature, road surface type, road surface temperature, road surface conditions, battery storage level, ambient temperature, current vehicle speed, for determining a most appropriate scenario to select. Again, in some examples the selection may be based on minimizing energy usage while maximizing potential for inducing wheel slip. In other examples, minimizing energy usage may be prioritized to a lesser or negligible extent, where the focus may be on maximizing potential for inducing wheel slip.

In some examples, the scenario selected at 625 may be based on driver preferences input into a screen associated with the vehicle dashboard, through an application running on a smartphone, laptop, tablet, etc., which is communicably coupled to the vehicle controller, etc. Specifically, as mentioned above, drift induced by scenario A includes vehicle behavior similar to what may occur in a manual transmission, where the driver may experience a loss of wheel torque during the process of inducing vehicle drift. Alternatively, scenarios B and C both include use of the electric machine (e.g. variable output for scenario B and steady output for scenario C) to provide torque output to the driven wheels after the DC clutch is commanded fully open. Thus, in one example the driver may prefer drift events where a loss of wheel torque is experienced upon commanding open the DC clutch to initiate the eClutch kick. In other examples the driver may prefer to avoid the loss of wheel torque otherwise experienced upon commanding fully open the DC clutch to initiate the eClutch kick, where the avoidance of loss of wheel torque may be achieved by conducting scenario B or scenario C. Therefore, in one example selecting which scenario (e.g. scenario A, scenario B, or scenario C) to carry out may be at least partially based on driver preferences, for example via a driveline tuning menu for performance applications. In other examples, the selection at 625 may be based on a fixed engineering calibration.

With the particular scenario selected, method 600 may proceed to 635, where the relevant actuators may be controlled so as to induce vehicle drift (refer to FIG. 4), as discussed in detail with regard to the various scenarios of FIG. 5, and which will be further discussed with regard to the timelines of FIGS. 7-12.

Returning to 620, in a situation where the TC lock-up clutch is determined to be locked at 620, method 600 may proceed to 630. At 630, method 600 includes selecting from one of the six different scenarios discussed above in detail at FIG. 5, in order to induce vehicle drift. While not specifically illustrated, it may be understood that a seventh scenario may include a situation where the vehicle does not include a DC clutch, and where the TC lock-up clutch is controlled in similar fashion as that described for scenario D.

Specifically, because the TC lock-up clutch is indicated to be locked, then scenario D may be used, which includes relying on the opening and then closing of the TC lock-up clutch to induce vehicle drift, without also opening and closing the DC clutch. Alternatively, scenarios E or F may also be used, which involve simultaneously commanding open the TC lock-up clutch and the DC clutch. Furthermore, any one of the scenarios A-C may be used because scenarios A-C can be used regardless of whether the TC lock-up clutch is closed or open, and as the scenarios A-C do not rely on any manipulation to the status of the TC lock-up clutch. As mentioned above, in one example the selection strategy may preferentially select one strategy over another based on driver preferences. For example, driver preferences may be input via a driveline tuning menu for performance applications. In other examples, the selection strategy may select a strategy that maximizes a potential for inducing wheel slip while minimizing an energy penalty for doing so. In other examples, the selection strategy may select a strategy that maximizes a potential for inducing wheel slip without emphasis on minimizing energy usage. As discussed above, the selection strategy may account for one or more of current tire temperature, tire pressure, road surface type, road surface temperature, ambient temperature, vehicle speed, battery storage level, etc., and may judge which strategy to select based on some combination of the variables. It may be understood that the controller may store instructions for processing such information in order to arrive at a most desirable selection for current operating and road conditions. In some examples, the selection at 630 may be based on a fixed engineering calibration.

With the appropriate strategy selected at 630, method 600 may proceed to 635, where the relevant actuators may be controlled so as to induce vehicle drift, as discussed in detail with regard to the various scenarios of FIG. 5, the method of FIG. 4, and as will be discussed in detail with regard to the timelines of FIGS. 7-12.

Thus, discussed herein, a method for inducing vehicle side slip may include opening a sole driveline disconnect clutch positioned between an engine and an electric machine upstream of a transmission in response to a request to induce vehicle drift, and closing the open sole driveline disconnect clutch after opening the sole driveline disconnect clutch without shifting gears of the transmission in response to the request to induce vehicle drift.

For such a method, opening the sole driveline disconnect clutch may include fully opening the sole driveline disconnect clutch, where closing the open sole driveline disconnect clutch includes fully closing the open sole driveline disconnect clutch, and where closing the open sole driveline disconnect clutch includes closing the open sole driveline disconnect clutch within a predetermined amount of time after opening the sole driveline disconnect clutch. Such a method may further comprise raising an engine speed during the predetermined amount of time.

For such a method, the method may further include controlling a torque output of the electric machine to a set of driven wheels during the predetermined amount of time. In some examples, the torque output of the electric machine may be controlled such that the electric machine does not provide any torque to the set of driven wheels during the predetermined amount of time. In some examples, the torque output of the electric machine to the set of driven wheels may be variable during the predetermined amount of time. In some examples, the torque output of the electric machine to the set of driven wheels may include a requested torque amount at a time corresponding to the opening of the sole driveline disconnect clutch. In some examples, the method may include commanding the set of driven wheels to a same rotational speed in response to the opening the sole driveline disconnect clutch.

For such a method, the method may further include responsive to opening the sole driveline disconnect clutch, maintaining open a torque converter lock-up clutch under conditions where the torque converter lock-up clutch is open. The method may further include maintaining closed the torque converter lock-up clutch under conditions where the torque converter lock-up clutch is closed.

For such a method, the method may further comprise opening the sole driveline disconnect clutch in response to an indication of an understeer angle greater than a threshold understeer angle for greater than a threshold duration of time.

For such a method, the method may further include opening the sole driveline disconnect clutch in response to a first paddle shifter and a second paddle shifter associated with a vehicle steering wheel being simultaneously depressed for greater than a predetermined time threshold.

Another example of a method for inducing a vehicle side-slip may include opening a lock-up clutch of a torque converter in response to a first set of predetermined conditions being met for inducing the vehicle side slip, the torque converter positioned downstream of transmission propulsion, and closing the lock-up clutch after opening the lock-up clutch without shifting gears of a transmission in response to a second set of predetermined conditions being met.

For such a method, the method may further include controlling an engine speed and an electric machine speed after opening the lock-up clutch and prior to closing the lock-up clutch. In such an example, the torque converter positioned downstream of transmission propulsion may further include the torque converter positioned downstream of an electric machine and upstream of the transmission, the electric machine positioned downstream of a driveline disconnect clutch positioned between an engine and the electric machine.

For such a method, the transmission input speed may be lower than the engine speed and/or the electric machine speed when the lock-up clutch is closed.

For such a method, the driveline disconnect clutch may be closed when the lock-up clutch is opened and at least one gear clutch of the transmission is closed when the lock-up clutch is opened. In such an example, the disconnect clutch may be maintained closed between opening the lock-up clutch and closing the lock-up clutch. Furthermore, torque from one or more of the engine and the electric machine may be delivered to a set of driven wheels between opening the lock-up clutch and closing the lock-up clutch.

For such a method, the method may further include commanding open the driveline disconnect clutch simultaneously with opening the lock-up clutch, increasing the engine speed and controlling the electric machine speed to match the engine speed, and closing the driveline disconnect clutch in response to a third set of predetermined conditions being met, where closing the driveline disconnect clutch occurs prior to the lock-up clutch being commanded closed.

For such a method, the method may further include commanding open the driveline disconnect clutch simultaneously with opening the lock-up clutch, increasing the engine speed and controlling the electric machine speed to a higher or a lower speed than the engine speed, and closing the driveline disconnect clutch in response to a fourth set of predetermined conditions being met, where closing the driveline disconnect clutch occurs after the lock-up clutch is closed.

Figure 7:
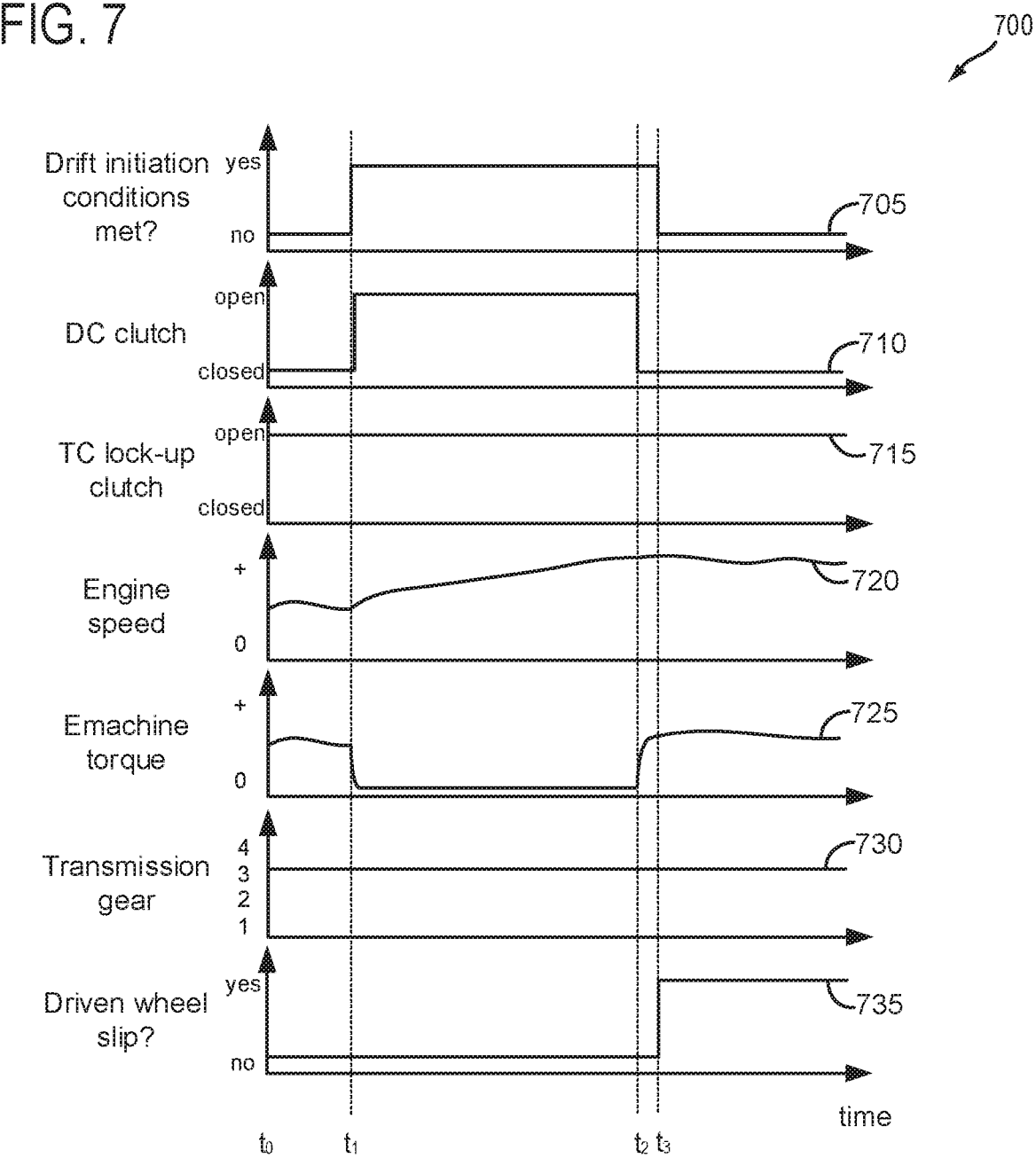
FIG. 7 shows an example timeline for initiating drift via a first scenario corresponding to the table of FIG. 5.

Turning now to FIG. 7, depicted is an example timeline 700 showing how scenario A is carried out over time. Timeline 700 includes plot 705, indicating whether conditions are met for initiating vehicle drift (yes or no), plot 710, indicating whether the DC clutch is fully open or fully closed, and plot 715, indicating whether the TC lock-up clutch is open or fully closed, over time. Timeline 700 further includes plot 720, indicating engine speed, over time. Engine speed may be either 0 RPM, or may be greater than (+) 0 RPM, over time. Timeline 700 further includes plot 725, indicating an electric machine torque, over time. Electric machine torque may be either ON-m, or may be greater than (+) 0 N-m, over time.

Timeline 700 further includes plot 730, indicating transmission gear (e.g. $1^{st}$, $2^{nd}$, $3^{rd}$, $4^{th}$; etc.) selected to transfer torque from the engine and/or electric machine to driven wheels, over time. Timeline 700 further includes plot 735, indicating whether both driven wheels (e.g. rear wheels 216 at FIG. 2) are slipping, or in other words, have broken traction with the road surface.

At time t0, drift initiation conditions are not yet met (plot 705). While not explicitly illustrated, it may be understood that the drift mode of operation has been selected by a driver (e.g. human or autonomous), but that conditions for initiating drift are not yet met. Specifically, at time t0 it has not yet been determined that the understeer angle is greater than the threshold understeer angle for greater than the threshold duration, and/or it has not been indicated that both paddle shifters have been depressed simultaneously for greater than the predetermined amount of time. At time t0, the DC clutch is closed (plot 710) and thus the engine is providing torque to the driven wheels. The TC lock-up clutch is open, thus providing some level of torque multiplication. The engine is spinning at a speed (plot 720) determined via a position of the accelerator pedal, and the electric machine torque (plot 725) is a function of current operating conditions. The transmission is in third gear (plot 730) at time t0. As of time t0, the driven wheels are not slipping against the road surface (plot 735).

At time t1, drift initiation conditions are indicated to be met. Thus, the understeer angle is inferred to be greater than the threshold understeer angle for greater than the threshold duration, or it is inferred that the transmission paddle shifters have been simultaneously depressed for greater than the predetermined amount of time, for example.

In response to drift initiation conditions being met at time t1, the DC clutch is commanded fully open via a control signal sent from the controller. The current open state of the TC lock-up clutch is not changed in response to the drift initiation conditions being met at time t1. With the DC clutch commanded open, the engine is disconnected from the driveline. Accordingly, between time t1 and t2, engine speed is rapidly increased. In the case of a human driver, engine speed is increased via the driver pressing down on the acceleration pedal. In the case of an autonomous driver, control strategy may control a position of the electronic intake throttle to a more open state to increase engine speed.

Furthermore, in response to drift initiation conditions being indicated to be met at time t1, the electric machine is commanded to stop producing torque (plot 725), or in other words, torque output from the electric machine to driven wheels is discontinued shortly after drift initiation conditions are indicated to be met at time t1.

The time between time t1 and t2 may be a predetermined time duration. The predetermined time duration may be determined via the controller, and may in some examples be a fixed value, whereas in other examples the predetermined time duration may be variable. As mentioned above, operational conditions including but not limited to tire pressure, tire temperature, road surface type, ambient temperature, vehicle speed, engine speed, electric machine speed, etc., may factor in to a determination via the controller as to how long to set the predetermined time duration in order to effectively initiate wheel slip for the drift maneuver.

At time t2, the predetermined duration elapses, and accordingly, the DC clutch is commanded fully closed. The TC lock-up clutch is maintained open, or in other words, there is no change in status of the TC lock-up clutch. While the TC lock-up clutch is depicted as being open, in other examples the TC lock-up clutch may be closed without departing from the scope of this disclosure. Furthermore, at time t2, the electric machine is commanded to produce a torque that the electric machine was producing prior to initiation of the eClutch kick event. However, while depicted as producing the torque that the electric machine was commanded to prior to initiation of the eClutch kick, it may be understood that with regard to the timeline of FIG. 7, upon commanding fully closed the DC clutch the electric machine may be selected to provide the maximum electric machine (or less) allowed.

The combination of increased engine speed and the rapid rise in electric machine torque at time t2 when the predetermined duration elapses induces both the driven wheels to slip at time t3 (plot 735). While not explicitly illustrated, the human driver may control a position of the steering wheel in response to the DC clutch being commanded fully closed, to induce oversteer for drift initiation. In the case of an autonomous driver, such control over the steering wheel may be commanded via the controller. For example, the steering wheel may be controlled to an oversteer position at a time corresponding to the DC clutch being commanded fully closed.

Thus, the sequence of actions undertaken prior to time t3 result in initiation of driven wheel slippage, thereby inducing vehicle drift. Accordingly, at time t3, drift initiation conditions are no longer met, as the drift event has been induced at time t3. After time t3, engine speed and electric motor torque are controlled in a manner to sustain the vehicle drift as commanded via the human or autonomous driver. Specifically, in the case of a human driver, the driver may control accelerator pedal position in a manner consistent with sustaining the vehicle drift as desired. The electric machine may be controlled as a function of driver demand, based at least in part on accelerator pedal position in the case of a human driver. In the case of an autonomous driver, in response to the eClutch kick event inducing wheel slippage, each of engine speed, electric motor torque and steering wheel position may be controlled autonomously. For example, based on information from inertial sensors (e.g. inertial sensors 367 at FIG. 3) including but not limited to vehicle yaw, the engine, electric machine and steering angle may be controlled so as to control and exit the drift maneuver. In some examples, during the drifting event of the vehicle where the driven wheels have broken traction with the road surface, a coefficient of friction for the road surface may be determined. Specifically, engine torque and wheel speed may be monitored. Engine torque may be estimated or inferred based on measurements made via one or more torque sensors (e.g. torque sensor 272 at FIG. 2), and in some examples additionally or alternatively based on data acquired via the crankshaft position sensor (e.g. position sensor 118 at FIG. 1) and electric machine torque. Engine torque may additionally or alternatively be calculated based on MAF (e.g. MAF sensor 120 at FIG. 1). Wheel speed may be monitored via one or more wheel speed sensors (e.g. wheel speed sensors 221 at FIG. 2). Based on the determined engine torque and wheel speed, a coefficient of friction for the road surface may be indicated. It may be understood that the coefficient of friction may vary with tire temperature and/or tire pressure, and thus in some examples, determining the coefficient of friction may include input from the tire pressure sensors (tire pressure sensors 365 at FIG. 3) and/or tire temperature sensors (e.g. tire temperature sensors 366). In some examples, a lookup table may be stored at the controller, where responsive to a determination of engine torque and wheel speed (and in some examples tire pressure and/or temperature), such a lookup table may be queried via the controller, to indicate a particular coefficient of friction for the current road surface. The coefficient of friction may be used by the controller to control one of engine speed, electric machine speed and steering angle for executing the vehicle drift maneuver. Such information may be used in some examples in conjunction with information retrieved from the inertial sensor(s) (e.g. yaw sensor). Controlling the vehicle in this manner may be particularly advantageous for autonomously controlled vehicles.

Figure 8:
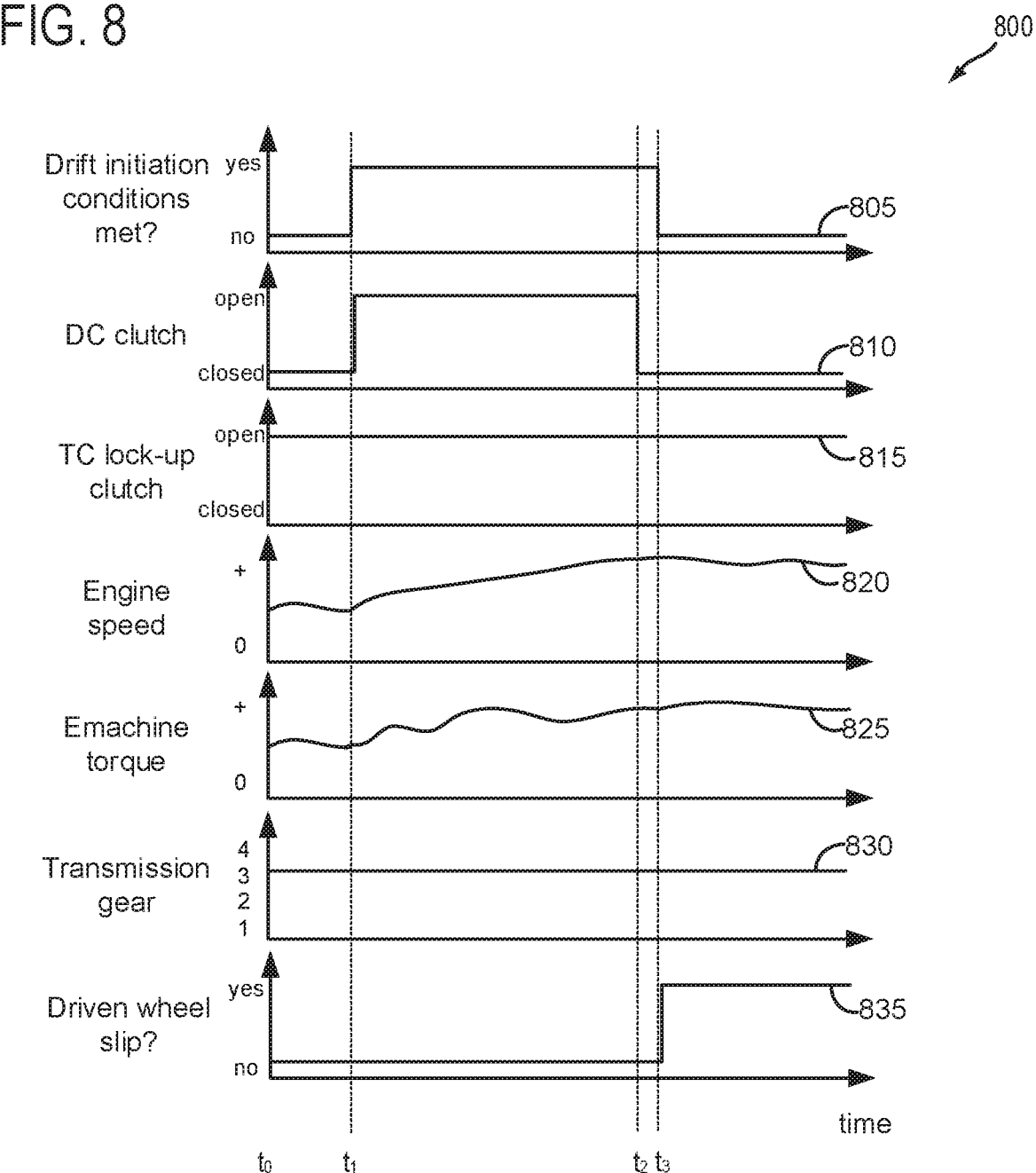
FIG. 8 shows an example timeline for initiating drift via a second scenario corresponding to the table of FIG. 5.

Turning now to FIG. 8, depicted is an example timeline 800 showing how scenario B is carried out over time. Timeline 800 includes plot 805, indicating whether conditions are met for initiating vehicle drift (yes or no), plot 810, indicating whether the DC clutch is fully open or fully closed, and plot 815, indicating whether the TC lock-up clutch is open or fully closed, over time. Timeline 800 further includes plot 820, indicating engine speed, over time. Engine speed may be either 0 RPM, or may be greater than (+) 0 RPM, over time. Timeline 800 further includes plot 825, indicating an electric machine torque, over time. Electric machine torque may be either 0 N-m, or may be greater than (+) 0 N-m, over time. Timeline 800 further includes plot 830, indicating transmission gear (e.g. $1^{st}$, $2^{nd}$, $3^{rd}$, $4^{th}$, etc.) selected to transfer torque from the engine and/or electric machine to driven wheels, over time. Timeline 800 further includes plot 835, indicating whether both driven wheels (e.g. rear wheels 216 at FIG. 2) are slipping, or in other words, have broken traction with the road surface.

At time t0, conditions for drift initiation are not indicated to be met (plot 805). While not explicitly illustrated, it may be understood that the drift mode of operation has been selected by a driver (e.g. human or autonomous), but that conditions for initiating drift are not yet met. Specifically, at time t0 it has not yet been determined that the understeer angle is greater than the threshold understeer angle for greater than the threshold duration, or it has not been indicated that both paddle shifters have been depressed simultaneously for greater than the predetermined amount of time, for example. At time t0, the DC clutch is fully closed (plot 810) and thus the engine is providing torque to the driven wheels. The TC lock-up clutch is open, thus providing some level of torque multiplication. The engine is spinning at a speed (plot 820) determined via a position of the accelerator pedal, and the electric machine torque (plot 825) is a function of current operating conditions. The transmission is in third gear (plot 830) at time t0. As of time t0, the driven wheels are not slipping against the road surface (plot 835).

At time t1, drift initiation conditions are indicated to be met. Thus, the understeer angle is inferred to be greater than the threshold understeer angle for greater than the threshold duration, or it is inferred that the transmission paddle shifters have been simultaneously depressed for greater than the predetermined amount of time, for example.

In response to drift initiation conditions being met at time t1, the DC clutch is commanded fully open via a control signal sent from the controller. The current open state of the TC lock-up clutch is not changed in response to the drift initiation conditions being met at time t1. With the DC clutch commanded fully open, the engine is disconnected from the driveline. Accordingly, between time t1 and t2, engine speed is rapidly increased. In the case of a human driver, engine speed is increased via the driver pressing down on the acceleration pedal. In the case of an autonomous driver, control strategy may control a position of the electronic intake throttle to a more open state to increase engine speed.

Furthermore, in response to drift initiation conditions being indicated to be met at time t1, the electric machine is commanded to provide variable torque to the driven wheels (plot 825). As mentioned above, by varying the torque produced by the electric machine, some level of propulsion torque/wheel speed may be maintained.

The time between time t1 and t2 may be a predetermined time duration. The predetermined time duration may be determined via the controller, and may in some examples be a fixed value, whereas in other examples the predetermined time duration may be variable. As mentioned above, operational conditions including but not limited to tire pressure, tire temperature, road surface type, ambient temperature, vehicle speed, engine speed, electric machine speed, etc., may factor in to a determination via the controller as to how long to set the predetermined time duration in order to effectively initiate wheel slip for the drift maneuver.

At time t2, the predetermined duration elapses, and accordingly, the DC clutch is commanded fully closed. The TC lock-up clutch is maintained open, or in other words, there is no change in status of the TC lock-up clutch. Furthermore, at time t2, the electric machine is controlled to provide torque the electric machine was providing when the DC clutch was commanded closed. The combination of increased engine speed and the torque output of the electric machine at time t2 when the predetermined duration elapses induces both the driven wheels to slip at time t3 (plot 735). While not explicitly illustrated, the human driver may control a position of the steering wheel in response to the DC clutch being commanded closed, to induce oversteer for drift initiation. In the case of an autonomous driver, such control over the steering wheel may be commanded via the controller. For example, the steering wheel may be controlled to an oversteer position at a time corresponding to the DC clutch being commanded closed.

Thus, the sequence of actions undertaken prior to time t3 result in initiation of driven wheel slippage, thereby inducing vehicle drift. Accordingly, at time t3, drift initiation conditions are no longer met, as the drift event has been induced at time t3. After time t3, engine speed and electric motor torque are controlled in a manner to sustain the vehicle drift as commanded via the human or autonomous driver. Specifically, in the case of a human driver, the driver may control accelerator pedal position in a manner consistent with sustaining the vehicle drift as desired. The electric machine torque output may be controlled as a function of driver demand, based at least in part on accelerator pedal position in the case of a human driver. In the case of an autonomous driver, in response to the eClutch kick event inducing wheel slippage, each of engine speed, electric motor speed and steering wheel position may be controlled autonomously. An example description of how the autonomously operated vehicle may be controlled to sustain and exit the drift has been discussed above with regard to FIG. 7, and thus will not be reiterated for brevity.

Figure 9:
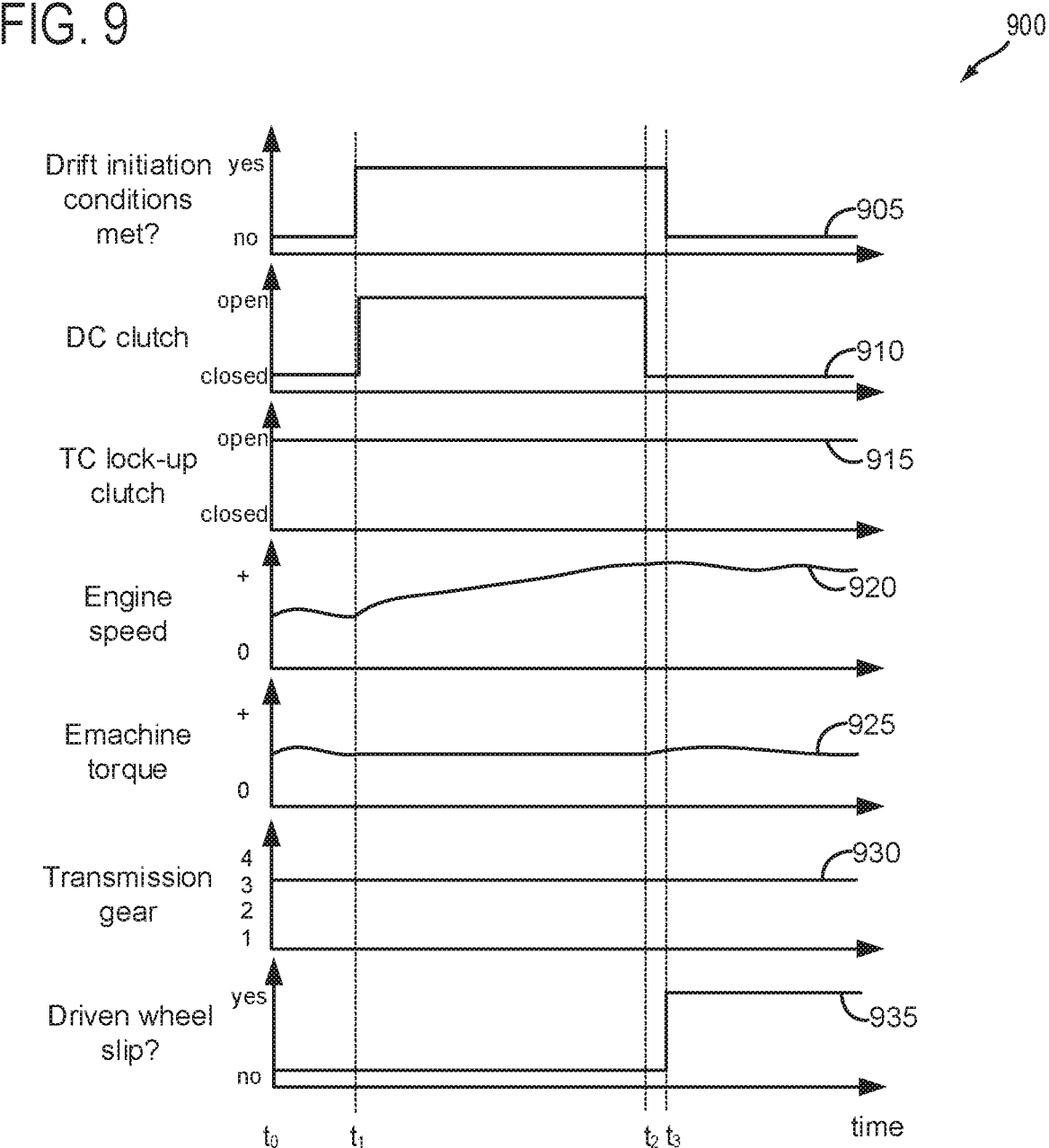
FIG. 9 shows an example timeline for initiating drift via a third scenario corresponding to the table of FIG. 5.

Turning now to FIG. 9, depicted is an example timeline 900 showing how scenario C is carried out over time. Timeline 900 includes plot 905, indicating whether conditions are met for initiating vehicle drift (yes or no), plot 910, indicating whether the DC clutch is fully open or fully closed, and plot 915, indicating whether the TC lock-up clutch is open or fully closed, over time. Timeline 900 further includes plot 920, indicating engine speed, over time. Engine speed may be either 0 RPM, or may be greater than (+) 0 RPM, over time. Timeline 900 further includes plot 925, indicating an electric machine torque, over time. Electric machine torque may be either 0 N-m, or may be greater than (+) 0 N-m, over time. Timeline 900 further includes plot 930, indicating transmission gear (e.g. $1^{st}$, $2^{nd}$, $3^{rd}$, 4th, etc.) selected to transfer torque from the engine and/or electric machine to driven wheels, over time. Timeline 900 further includes plot 935, indicating whether both driven wheels (e.g. rear wheels 216 at FIG. 2) are slipping, or in other words, have broken traction with the road surface.

At time t0, conditions for drift initiation are not indicated to be met (plot 905). While not explicitly illustrated, it may be understood that the drift mode of operation has been selected by a driver (e.g. human or autonomous), but that conditions for initiating drift are not yet met. Specifically, at time t0 it has not yet been determined that the understeer angle is greater than the threshold understeer angle for greater than the threshold duration, or it has not been indicated that both paddle shifters have been depressed simultaneously for greater than the predetermined amount of time, for example. At time t0, the DC clutch is fully closed (plot 910) and thus the engine is providing torque to the driven wheels. The TC lock-up clutch is open, thus providing some level of torque multiplication. The engine is spinning at a speed (plot 920) determined via a position of the accelerator pedal, and the electric machine torque (plot 925) is a function of current operating conditions. The transmission is in third gear (plot 930) at time t0. As of time t0, the driven wheels are not slipping against the road surface (plot 935).

At time t1, drift initiation conditions are indicated to be met. Thus, the understeer angle is inferred to be greater than the threshold understeer angle for greater than the threshold duration, or it is inferred that the transmission paddle shifters have been simultaneously depressed for greater than the predetermined amount of time, for example.

In response to drift initiation conditions being met at time t1, the DC clutch is commanded fully open via a control signal sent from the controller. The current open state of the TC lock-up clutch is not changed in response to the drift initiation conditions being met at time t1. With the DC clutch commanded open, the engine is disconnected from the driveline. Accordingly, between time t1 and t2, engine speed is rapidly increased. In the case of a human driver, engine speed is increased via the driver pressing down on the acceleration pedal. In the case of an autonomous driver, control strategy may control a position of the electronic intake throttle to a more open state to increase engine speed.

Furthermore, in response to drift initiation conditions being indicated to be met at time t1, the electric machine is commanded to provide a constant level of torque to the driven wheels (plot 925), where the constant level of torque is a torque level requested at the time when the DC clutch is commanded closed. While not explicitly illustrated, it may be understood that a speed of the electric machine may be varied in order to maintain the constant level of torque.

The time between time t1 and t2 may be a predetermined time duration. The predetermined time duration may be determined via the controller, and may in some examples be a fixed value, whereas in other examples the predetermined time duration may be variable. As mentioned above, operational conditions including but not limited to tire pressure, tire temperature, road surface type, ambient temperature, vehicle speed, engine speed, electric machine speed, electric machine torque, etc., may factor in to a determination via the controller as to how long to set the predetermined time duration in order to effectively initiate wheel slip for the drift maneuver.

At time t2, the predetermined duration elapses, and accordingly, the DC clutch is commanded fully closed. The TC lock-up clutch is maintained open, or in other words, there is no change in status of the TC lock-up clutch. Furthermore, at time t2, the electric machine is controlled to produce torque that the electric machine was producing when the DC clutch was commanded fully closed. The combination of increased engine speed and the output of the electric machine at time t2 when the predetermined duration elapses induces both the driven wheels to slip at time t3 (plot 935). While not explicitly illustrated, the human driver may control a position of the steering wheel in response to the DC clutch being commanded closed, to induce oversteer for drift initiation. In the case of an autonomous driver, such control over the steering wheel may be commanded via the controller. For example, the steering wheel may be controlled to an oversteer position at a time corresponding to the DC clutch being commanded closed.

Thus, the sequence of actions undertaken prior to time t3 result in initiation of driven wheel slippage, thereby inducing vehicle drift. Accordingly, at time t3, drift initiation conditions are no longer met, as the drift event has been induced at time t3. After time t3, engine speed and electric motor torque are controlled in a manner to sustain the vehicle drift as commanded via the human or autonomous driver. Specifically, in the case of a human driver, the driver may control accelerator pedal position in a manner consistent with sustaining the vehicle drift as desired. The electric machine may be controlled as a function of driver demand, based at least in part on accelerator pedal position in the case of a human driver. In the case of an autonomous driver, in response to the eClutch kick event inducing wheel slippage, each of engine speed, electric motor torque and steering wheel position may be controlled autonomously. An example description of how the autonomously operated vehicle may be controlled to sustain and exit the drift has been discussed above with regard to FIG. 7, and thus will not be reiterated for brevity.

Figure 10:
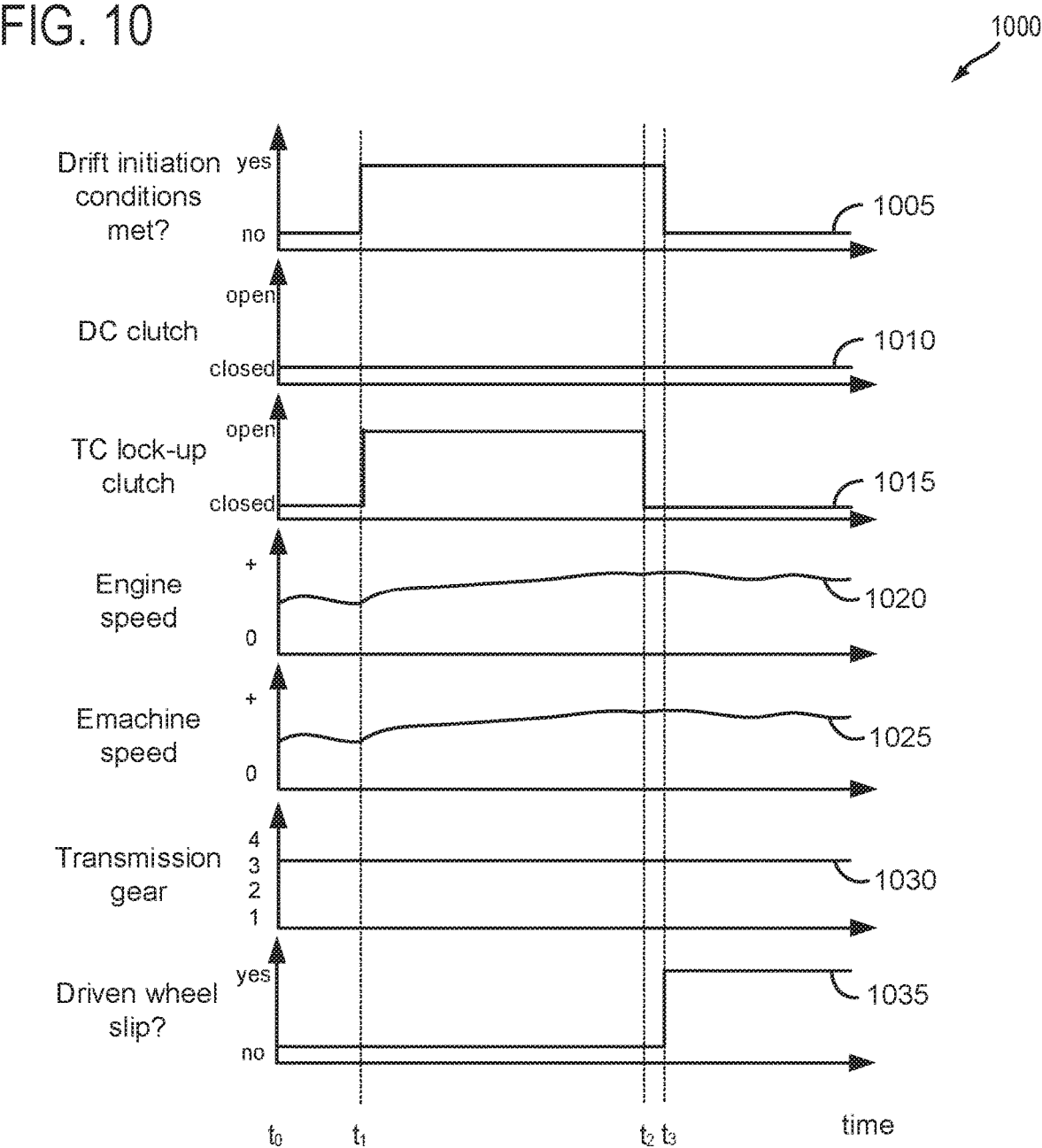
FIG. 10 shows an example timeline for initiating drift via a fourth scenario corresponding to the table of FIG. 5.

Turning now to FIG. 10, depicted is an example timeline 1000 showing how scenario D is carried out over time. Timeline 1000 includes plot 1005, indicating whether conditions are met for initiating vehicle drift (yes or no), plot 1010, indicating whether the DC clutch is fully open or fully closed, and plot 1015, indicating whether the TC lock-up clutch is open or fully closed, over time. Timeline 1000 further includes plot 1020, indicating engine speed, over time. Engine speed may be either 0 RPM, or may be greater than (+) 0 RPM, over time. Timeline 1000 further includes plot 1025, indicating an electric machine speed, over time. Electric machine speed may be either 0 RPM, or may be greater than (+) 0 RPM, over time. Timeline 1000 further includes plot 1030, indicating transmission gear (e.g. $1^{st}$, $2^{nd}$, $3^{rd}$, $4^{th}$, etc.) selected to transfer torque from the engine and/or electric machine to driven wheels, over time. Timeline 1000 further includes plot 1035, indicating whether both driven wheels (e.g. rear wheels 216 at FIG. 2) are slipping, or in other words, have broken traction with the road surface.

At time t0, conditions for drift initiation are not indicated to be met (plot 1005). While not explicitly illustrated, it may be understood that the drift mode of operation has been selected by a driver (e.g. human or autonomous), but that conditions for initiating drift are not yet met. Specifically, at time t0 it has not yet been determined that the understeer angle is greater than the threshold understeer angle for greater than the threshold duration, or it has not been indicated that both paddle shifters have been depressed simultaneously for greater than the predetermined amount of time, for example. At time t0, the DC clutch is fully closed (plot 1010) and thus the engine is providing torque to the driven wheels. The TC lock-up clutch is fully closed or in other words, locked (plot 1015). The engine is spinning at a speed (plot 1020) determined via a position of the accelerator pedal, and the electric machine speed (plot 1025) is a function of current operating conditions. The transmission is in third gear (plot 1030) at time t0. As of time t0, the driven wheels are not slipping against the road surface (plot 1035).

At time t1, drift initiation conditions are indicated to be met. Thus, the understeer angle is inferred to be greater than the threshold understeer angle for greater than the threshold duration, or it is inferred that the transmission paddle shifters have been simultaneously depressed for greater than the predetermined amount of time, for example.

In response to drift initiation conditions being met at time t1, the DC clutch is maintained fully closed, in contrast to the above-mentioned scenarios discussed at FIGS. 7-9. Instead, the TC lock-up clutch is commanded open at time t1. The opening of the TC lock-up clutch allows for torque multiplication during the process of initiating drift. Furthermore, because the DC clutch is maintained fully closed, the engine remains connected to the driveline. Thus, torque multiplication is a function of both the engine and the electric machine in this example timeline.

Between time t1 and t2, engine speed is increased and additionally the electric machine speed is increased. In the case of a human driver, engine speed is increased via the driver pressing down on the acceleration pedal. In the case of an autonomous driver, control strategy may control a position of the electronic intake throttle to a more open state to increase engine speed. Control of the electric machine speed may be via the controller, and electric machine speed may be at least in part a function of driver demand.

The time between time t1 and t2 may be a predetermined time duration. The predetermined time duration may be determined via the controller, and may in some examples be a fixed value, whereas in other examples the predetermined time duration may be variable. As mentioned above, operational conditions including but not limited to tire pressure, tire temperature, road surface type, ambient temperature, vehicle speed, engine speed, electric machine speed, etc., may factor in to a determination via the controller as to how long to set the predetermined time duration in order to effectively initiate wheel slip for the drift maneuver.

At time t2, the predetermined duration elapses, and accordingly, the TC lock-up clutch is commanded fully closed. The DC clutch is maintained closed, or in other words, there is no change in status of the DC clutch. The combination of increased engine speed and the output of the electric machine at time t2 when the predetermined duration elapses induces both the driven wheels to slip at time t3 (plot 1035). While not explicitly illustrated, the human driver may control a position of the steering wheel in response to the TC lock-up clutch being commanded fully closed, to induce oversteer for drift initiation. In the case of an autonomous driver, such control over the steering wheel may be commanded via the controller. For example, the steering wheel may be controlled to an oversteer position at a time corresponding to the TC lock-up clutch being commanded fully closed. It may be understood that the fully closing of the TC lock-up clutch at time t2 may provide impulse to the driveline that may induce the driven wheels to slip or brake traction, provided that the speed of the engine and electric machine are greater than transmission input speed.

Thus, the sequence of actions undertaken prior to time t3 result in initiation of driven wheel slippage, thereby inducing vehicle drift. Accordingly, at time t3, drift initiation conditions are no longer met, as the drift event has been induced at time t3. After time t3, engine speed and electric motor speed are controlled in a manner to sustain the vehicle drift as commanded via the human or autonomous driver. Specifically, in the case of a human driver, the driver may control accelerator pedal position in a manner consistent with sustaining the vehicle drift as desired. The electric machine may be controlled as a function of driver demand, based at least in part on accelerator pedal position in the case of a human driver. In the case of an autonomous driver, in response to the eClutch kick event inducing wheel slippage, each of engine speed, electric motor speed and steering wheel position may be controlled autonomously. An example description of how the autonomously operated vehicle may be controlled to sustain and exit the drift has been discussed above with regard to FIG. 7, and thus will not be reiterated for brevity.

Figure 11:
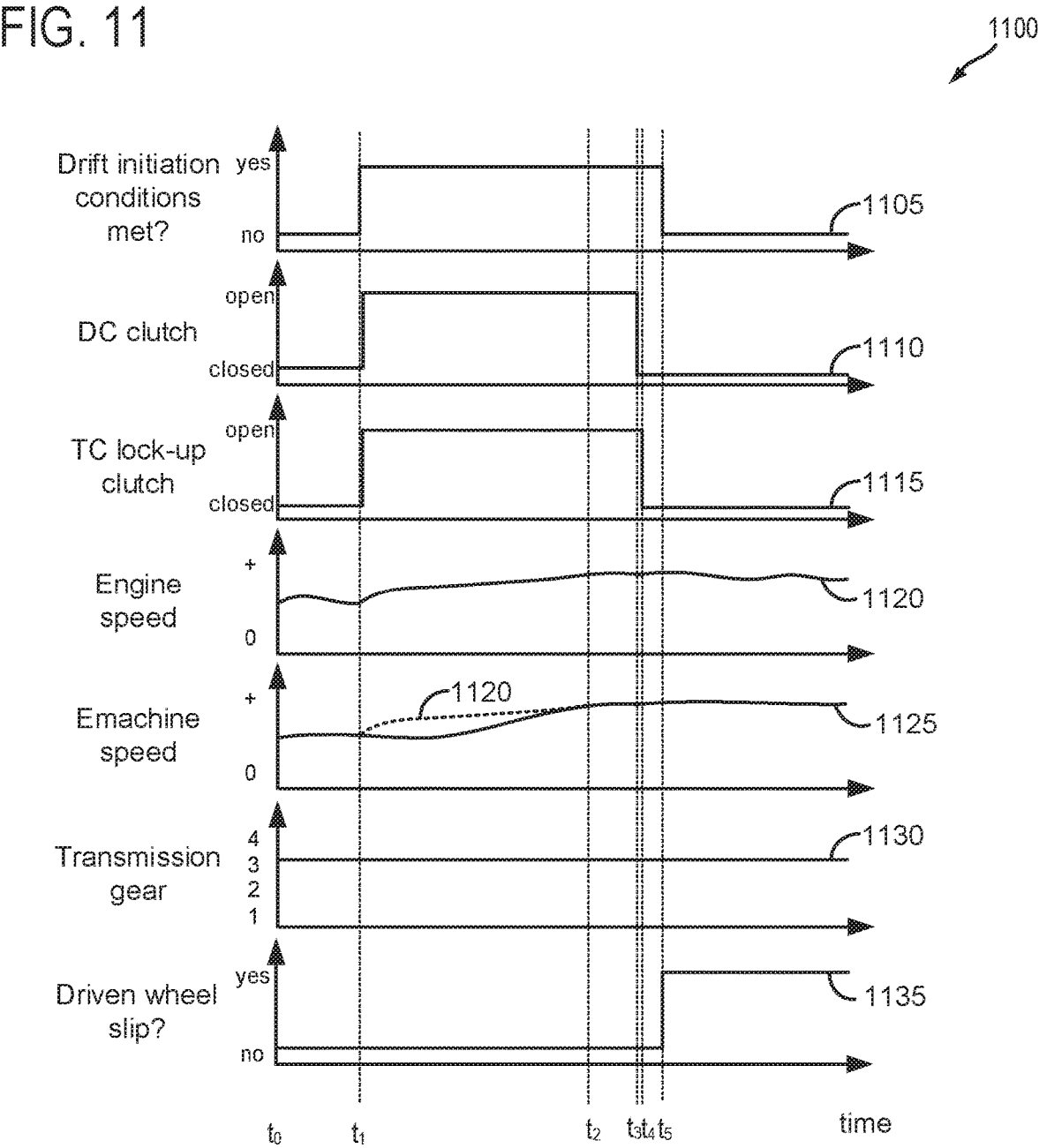
FIG. 11 shows an example timeline for initiating drift via a fifth scenario corresponding to the table to FIG. 5.

Turning now to FIG. 11, depicted is an example timeline 1100 showing how scenario E is carried out over time. Timeline 1100 includes plot 1105, indicating whether conditions are met for initiating vehicle drift (yes or no), plot 1110, indicating whether the DC clutch is fully open or fully closed, and plot 1115, indicating whether the TC lock-up clutch is open or fully closed, over time. Timeline 1100 further includes plot 1120, indicating engine speed, over time. Engine speed may be either 0 RPM, or may be greater than (+) 0 RPM, over time. Timeline 1100 further includes plot 1125, indicating an electric machine speed, over time. Electric machine speed may be either 0 RPM, or may be greater than (+) 0 RPM, over time. Timeline 1100 further includes plot 1130, indicating transmission gear (e.g. $1^{st}$, $2^{nd}$, $3^{rd}$, $4^{th}$, etc.) selected to transfer torque from the engine and/or electric machine to driven wheels, over time. Timeline 1100 further includes plot 1135, indicating whether both driven wheels (e.g. rear wheels 216 at FIG. 2) are slipping, or in other words, have broken traction with the road surface.

At time t0, conditions for drift initiation are not indicated to be met (plot 1105). While not explicitly illustrated, it may be understood that the drift mode of operation has been selected by a driver (e.g. human or autonomous), but that conditions for initiating drift are not yet met. Specifically, at time t0 it has not yet been determined that the understeer angle is greater than the threshold understeer angle for greater than the threshold duration, or it has not been indicated that both paddle shifters have been depressed simultaneously for greater than the predetermined amount of time, for example. At time t0, the DC clutch is fully closed (plot 1110) and thus the engine is providing torque to the driven wheels. The TC lock-up clutch is fully closed or in other words, locked (plot 1115). The engine is spinning at a speed (plot 1120) determined via a position of the accelerator pedal, and the electric machine speed (plot 1125) is a function of current operating conditions. The transmission is in third gear (plot 1130) at time t0. As of time t0, the driven wheels are not slipping against the road surface (plot 1135).

At time t1, drift initiation conditions are indicated to be met. Thus, the understeer angle is inferred to be greater than the threshold understeer angle for greater than the threshold duration, or it is inferred that the transmission paddle shifters have been simultaneously depressed for greater than the predetermined amount of time, for example.

In response to drift initiation conditions being met at time t1, both the DC clutch and the TC lock-up clutch are commanded open. The commanding fully open of the DC clutch serves to disconnect the engine from the driveline. The opening of the TC lock-up clutch allows for torque multiplication during the process of initiating drift.

Between time t1 and t2, engine speed is increased. In the case of a human driver, engine speed is increased via the driver pressing down on the acceleration pedal. In the case of an autonomous driver, control strategy may control a position of the electronic intake throttle to a more open state to increase engine speed. During the time frame spanning t1 and t2, a speed of the electric machine is controlled to match engine speed (plot 1125). Thus, for reference engine speed 1120 is depicted as a dotted line at the plot corresponding to electric machine speed. As illustrated, electric machine speed (plot 1125) converges with engine speed (plot 1120) at time t2.

Similar to that discussed above, the time between time t1 and t4 may be a predetermined time duration. In this example timeline, the predetermined time duration is referred to as a first predetermined duration. The predetermined time duration may be determined via the controller, and may in some examples be a fixed value, whereas in other examples the predetermined time duration may be variable. As mentioned above, operational conditions including but not limited to tire pressure, tire temperature, road surface type, ambient temperature, vehicle speed, engine speed, electric machine speed, etc., may factor in to a determination via the controller as to how long to set the predetermined time duration in order to effectively initiate wheel slip for the drift maneuver.

With regard to this example timeline 1100, the first predetermined time duration pertains to a time duration in which the TC lock-up clutch is to be commanded fully closed. In such an example, the DC clutch may be commanded fully closed within a second predetermined duration of the TC lock-up clutch being commanded closed. Specifically, the DC clutch may be commanded fully closed prior to the TC lock-up clutch being commanded fully closed, within the second predetermined duration of the TC lock-up clutch being commanded fully closed. The sequence of commanding fully closed the DC clutch and then the TC lock-up clutch may provide a torque impulse to the driveline sufficient for inducing driven wheel slip, discussed in further detail below.

Thus, at time t3, just prior to time t4, (within the second predetermined duration of the first predetermined time duration elapsing) the DC clutch is commanded fully closed (plot 1110), and shortly thereafter the TC lock-up clutch is commanded fully closed (plot 1115) at time t4. The combination of increased engine speed and the output of the electric machine at time t4 when the predetermined duration elapses induces both the driven wheels to slip at time t5 (plot 1135). While not explicitly illustrated, the human driver may control a position of the steering wheel in response to the DC clutch and the TC lock-up clutch being commanded closed, to induce oversteer for drift initiation. In the case of an autonomous driver, such control over the steering wheel may be commanded via the controller. For example, the steering wheel may be controlled to an oversteer position at a time corresponding to either the DC clutch or the TC lock-up clutch being commanded closed.

Thus, the sequence of actions undertaken prior to time t5 result in initiation of driven wheel slippage, thereby inducing vehicle drift. Accordingly, at time t5, drift initiation conditions are no longer met, as the drift event has been induced at time t5. After time t5, engine speed and electric motor speed are controlled in a manner to sustain the vehicle drift as commanded via the human or autonomous driver. Specifically, in the case of a human driver, the driver may control accelerator pedal position in a manner consistent with sustaining the vehicle drift as desired. The electric machine may be controlled as a function of driver demand, based at least in part on accelerator pedal position in the case of a human driver. In the case of an autonomous driver, in response to the eClutch kick event inducing wheel slippage, each of engine speed, electric motor speed and steering wheel position may be controlled autonomously. An example description of how the autonomously operated vehicle may be controlled to sustain and exit the drift has been discussed above with regard to FIG. 7, and thus will not be reiterated for brevity.

Figure 12:
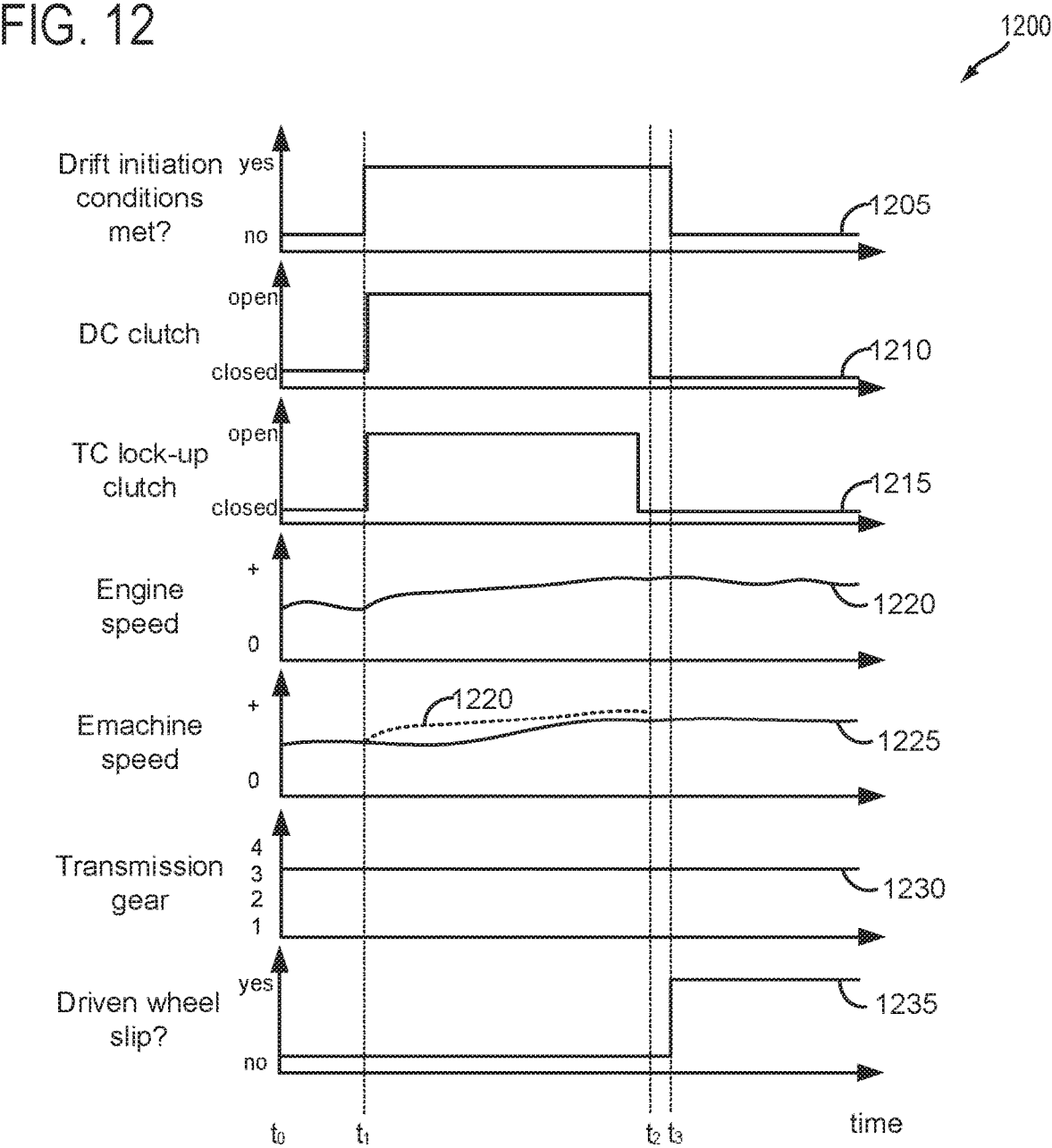
FIG. 12 shows an example timeline for initiating drift via a sixth scenario corresponding to the table of FIG. 5.

Turning now to FIG. 12, depicted is an example timeline 1200 showing how scenario F is carried out over time. Timeline 1200 includes plot 1205, indicating whether conditions are met for initiating vehicle drift (yes or no), plot 1210, indicating whether the DC clutch is fully open or fully closed, and plot 1215, indicating whether the TC lock-up clutch is open or fully closed, over time. Timeline 1200 further includes plot 1220, indicating engine speed, over time. Engine speed may be either 0 RPM, or may be greater than (+) 0 RPM, over time. Timeline 1200 further includes plot 1225, indicating an electric machine speed, over time. Electric machine speed may be either 0 RPM, or may be greater than (+) 0 RPM, over time. Timeline 1200 further includes plot 1230, indicating transmission gear (e.g. $1^{st}$, $2^{nd}$, $3^{rd}$, $4^{th}$, etc.) selected to transfer torque from the engine and/or electric machine to driven wheels, over time. Timeline 1200 further includes plot 1235, indicating whether both driven wheels (e.g. rear wheels 216 at FIG. 2) are slipping, or in other words, have broken traction with the road surface.

At time t0, conditions for drift initiation are not indicated to be met (plot 1205). While not explicitly illustrated, it may be understood that the drift mode of operation has been selected by a driver (e.g. human or autonomous), but that conditions for initiating drift are not yet met. Specifically, at time t0 it has not yet been determined that the understeer angle is greater than the threshold understeer angle for greater than the threshold duration, or it has not been indicated that both paddle shifters have been depressed simultaneously for greater than the predetermined amount of time, for example. At time t0, the DC clutch is fully closed (plot 1210) and thus the engine is providing torque to the driven wheels. The TC lock-up clutch is fully closed or in other words, locked (plot 1215). The engine is spinning at a speed (plot 1220) determined via a position of the accelerator pedal, and the electric machine speed (plot 1225) is a function of current operating conditions. The transmission is in third gear (plot 1230) at time t0. As of time t0, the driven wheels are not slipping against the road surface (plot 1235).

At time t1, drift initiation conditions are indicated to be met. Thus, the understeer angle is inferred to be greater than the threshold understeer angle for greater than the threshold duration, or it is inferred that the transmission paddle shifters have been simultaneously depressed for greater than the predetermined amount of time, for example.

In response to drift initiation conditions being met at time t1, both the DC clutch and the TC lock-up clutch are commanded open. The commanding fully open of the DC clutch serves to disconnect the engine from the driveline. The opening of the TC lock-up clutch allows for torque multiplication during the process of initiating drift.

Between time t1 and t2, engine speed is increased. In the case of a human driver, engine speed is increased via the driver pressing down on the acceleration pedal. In the case of an autonomous driver, control strategy may control a position of the electronic intake throttle to a more open state to increase engine speed. During the time frame spanning t1 and t2, a speed of the electric machine (plot 1225) is controlled to a speed lesser than the engine speed. Thus, for reference engine speed 1220 is depicted as a dotted line at the plot corresponding to electric machine speed. As illustrated, electric machine speed (plot 1225) is increased to a speed greater than the engine speed (plot 1220) during the time between t1 and t2. Said another way, the electric machine speed does not speed-match the engine speed in this particular timeline 1200. While electric machine speed is depicted as being controlled to a speed greater than engine speed, in other examples electric machine speed may be controlled to a speed lesser than engine speed without departing from the scope of this disclosure.

Similar to that discussed above, the time between time t1 and t2 may be a predetermined time duration. In this example timeline, the predetermined time duration is referred to as a first predetermined duration. The predetermined time duration may be determined via the controller, and may in some examples be a fixed value, whereas in other examples the predetermined time duration may be variable. As mentioned above, operational conditions including but not limited to tire pressure, tire temperature, road surface type, ambient temperature, vehicle speed, engine speed, electric machine speed, etc., may factor in to a determination via the controller as to how long to set the predetermined time duration in order to effectively initiate wheel slip for the drift maneuver.

With regard to this example timeline 1200, the first predetermined time duration pertains to a time duration in which the DC clutch is to be commanded fully closed. In such an example, the TC lock-up clutch may be commanded fully closed within a second predetermined duration of the DC clutch being commanded closed. Specifically, the TC lock-up clutch may be commanded fully closed prior to the DC clutch being commanded fully closed, within the second predetermined duration of the DC clutch being commanded fully closed. The sequence of commanding fully closed the TC lock-up clutch and then the DC clutch may provide a torque impulse to the driveline sufficient for inducing driven wheel slip, discussed in further detail below. An advantage of closing the TC lock-up clutch and then the DC clutch may allow the electric machine to negate some driveline inertia prior to the engine torque impulse provided via the closing of the DC clutch.

Thus, just prior to time t2 (within the second predetermined duration of the first predetermined time duration elapsing) the TC lock-up clutch is commanded fully closed (plot 1215), and shortly thereafter the DC clutch is commanded fully closed (plot 1210). The combination of increased engine speed and the output of the electric machine at time t2 when the predetermined duration elapses induces both the driven wheels to slip at time t3 (plot 1235). While not explicitly illustrated, the human driver may control a position of the steering wheel in response to the DC clutch and the TC lock-up clutch being commanded fully closed, to induce oversteer for drift initiation. In the case of an autonomous driver, such control over the steering wheel may be commanded via the controller. For example, the steering wheel may be controlled to an oversteer position at a time corresponding to either the DC clutch or the TC lock-up clutch being commanded fully closed.

Thus, the sequence of actions undertaken prior to time t3 result in initiation of driven wheel slippage, thereby inducing vehicle drift. Accordingly, at time t3, drift initiation conditions are no longer met, as the drift event has been induced at time t3. After time t3, engine speed and electric motor speed are controlled in a manner to sustain the vehicle drift as commanded via the human or autonomous driver. Specifically, in the case of a human driver, the driver may control accelerator pedal position in a manner consistent with sustaining the vehicle drift as desired. The electric machine may be controlled as a function of driver demand, based at least in part on accelerator pedal position in the case of a human driver. In the case of an autonomous driver, in response to the eClutch kick event inducing wheel slippage, each of engine speed, electric motor speed and steering wheel position may be controlled autonomously. An example description of how the autonomously operated vehicle may be controlled to sustain and exit the drift has been discussed above with regard to FIG. 7, and thus will not be reiterated for brevity.

While not explicitly discussed above for the timelines depicted at FIGS. 7-12, for any one of the above-mentioned strategies it may be understood that the rear differential may be commanded locked so as to prevent one wheel from taking all the system torque. In examples where such locking of the rear differential is desired or requested, it may be understood that the rear differential may be locked at a time corresponding to when conditions are met for initiating the eClutch kick event, or any time between when the DC clutch and/or the TC lock-up clutch is commanded open and when the DC clutch and/or the TC lock-up clutch is commanded closed. Determining whether to lock the rear differential may be dependent on one or more conditions related to road surface type, road surface temperature, tire temperature, tire pressure, vehicle speed, etc. For example, based on such information, the controller may assess whether it is expected that one wheel may start spinning take a disproportionate amount of torque from the other wheel, which may degrade the action of inducing vehicle drift. If the controller determines that, based on current conditions it is expected that the vehicle drift maneuver may be degraded if the rear differential is not locked, then the controller may command the rear differential locked at the appropriate time for the strategies depicted by the timelines of FIGS. 7-12.

In this way, vehicle drift events may be reliably induced in a hybrid electric vehicle with a driveline that includes a disconnect clutch positioned between an engine and an electric machine, a torque converter with a torque converter lock-up clutch positioned downstream of the electric machine and upstream of an automatic transmission, and with driven wheels positioned downstream of the automatic transmission.

The technical effect of controlling drift events by commanding open one or more of the DC clutch and the TC lock-up clutch and then commanding closed one or more of the DC clutch and the TC lock-up clutch, is that engine speed and/or electric machine speed may be controlled during the time period that the DC clutch and/or the TC lock-up clutch are open, in a manner that may induce vehicle drift upon closing one or more of the DC clutch and the TC lock-up clutch, without requiring a change in transmission gearing. A benefit of not shifting gears may be that the presently engaged gear may more closely provide a desired wheel torque to maintain the vehicle side slip, as opposed to having to shift to another perhaps less desirable gear for maintaining vehicle drift.

The systems described herein and with reference to FIGS. 1-3, along with the methods discussed herein with regard to FIG. 4 and FIG. 6, may enable one or more systems and one or more methods. In one example, a method for inducing vehicle side slip comprises opening a sole driveline disconnect clutch positioned between an engine and an electric machine upstream of a transmission in response to a request to induce vehicle drift; and closing the open sole driveline disconnect clutch after opening the sole driveline disconnect clutch without shifting gears of the transmission in response to the request to induce vehicle drift. In a first example of the method, the method further includes where opening the sole driveline disconnect clutch includes fully opening the sole driveline disconnect clutch, where closing the open sole driveline disconnect clutch includes fully closing the open sole driveline disconnect clutch, and where closing the open sole driveline disconnect clutch includes closing the open sole driveline disconnect clutch within a predetermined amount of time after opening the sole driveline disconnect clutch, and further comprising: raising an engine speed during the predetermined amount of time. A second example of the method optionally includes the first example, and further comprises controlling a torque output of the electric machine to a set of driven wheels during the predetermined amount of time. A third example of the method optionally includes any one or more or each of the first through second examples, and further includes wherein the torque output of the electric machine is controlled such that the electric machine does not provide any torque to the set of driven wheels during the predetermined amount of time. A fourth example of the method optionally includes any one or more or each of the first through third examples, and further includes wherein the torque output of the electric machine to the set of driven wheels is variable during the predetermined amount of time. A fifth example of the method optionally includes any one or more or each of the first through fourth examples, and further includes wherein the torque output of the electric machine to the set of driven wheels includes a requested torque amount at a time corresponding to the opening of the sole driveline disconnect clutch. A sixth example of the method optionally includes any one or more or each of the first through fifth examples, and further comprises commanding the set of driven wheels to a same rotational speed in response to the opening the sole driveline disconnect clutch. A seventh example of the method optionally includes any one or more or each of the first through sixth examples, and further comprises responsive to opening the sole driveline disconnect clutch, maintaining open a torque converter lock-up clutch under conditions where the torque converter lock-up clutch is open; and maintaining closed the torque converter lock-up clutch under conditions where the torque converter lock-up clutch is closed. An eighth example of the method optionally includes any one or more or each of the first through seventh examples, and further comprises opening the sole driveline disconnect clutch in response to an indication of an understeer angle greater than a threshold understeer angle for greater than a threshold duration of time. A ninth example of the method optionally includes any one or more or each of the first through eighth examples, and further comprises opening the sole driveline disconnect clutch in response to a first paddle shifter and a second paddle shifter associated with a vehicle steering wheel being simultaneously depressed for greater than a predetermined time threshold.

Another example of a method for inducing side slip comprises opening a lock-up clutch of a torque converter in response to a first set of predetermined conditions being met for inducing the vehicle side slip, the torque converter positioned downstream of transmission propulsion; and closing the lock-up clutch after opening the lock-up clutch without shifting gears of a transmission in response to a second set of predetermined conditions being met. In a first example of the method, the method further comprises controlling an engine speed and an electric machine speed after opening the lock-up clutch and prior to closing the lock-up clutch; and wherein the torque converter positioned downstream of transmission propulsion further includes the torque converter positioned downstream of an electric machine and upstream of the transmission, the electric machine positioned downstream of a driveline disconnect clutch positioned between an engine and the electric machine. A second example of the method optionally includes the first example, and further includes wherein a transmission input speed is lower than the engine speed and/or the electric machine speed when the lock-up clutch is closed. A third example of the method optionally includes any one or more or each of the first through second examples, and further includes wherein the driveline disconnect clutch is closed when the lock-up clutch is opened and at least one gear clutch of the transmission is closed when the lock-up clutch is opened; wherein the disconnect clutch is maintained closed between opening the lock-up clutch and closing the lock-up clutch; and wherein torque from one or more of the engine and the electric machine is delivered to a set of driven wheels between opening the lock-up clutch and closing the lock-up clutch. A fourth example of the method optionally includes any one or more or each of the first through third examples, and further comprises commanding open the driveline disconnect clutch simultaneously with opening the lock-up clutch; increasing the engine speed and controlling the electric machine speed to match the engine speed; and closing the driveline disconnect clutch in response to a third set of predetermined conditions being met, where closing the driveline disconnect clutch occurs prior to the lock-up clutch being commanded closed. A fifth example of the method optionally includes any one or more or each of the first through fourth examples, and further comprises commanding open the driveline disconnect clutch simultaneously with opening the lock-up clutch; increasing the engine speed and controlling the electric machine speed to a higher or a lower speed than the engine speed; and closing the driveline disconnect clutch in response to a fourth set of predetermined conditions being met, where closing the driveline disconnect clutch occurs after the lock-up clutch is closed.

A system for a hybrid electric vehicle comprises a driveline disconnect clutch positioned between an engine and an electric machine; a torque converter including a lock-up clutch positioned between the electric machine and an automatic transmission; and a controller with computer readable instructions stored on non-transitory memory that when executed, cause the controller to: receive a request to induce a vehicle side-slip; command open one or more of the driveline disconnect clutch and the lock-up clutch and in response, control an engine speed and an electric machine speed; and command closed one or more of the driveline disconnect clutch and the lock-up clutch in response to the request to induce the vehicle side-slip after a predetermined amount of time has elapsed since commanding open one or more of the driveline disconnect clutch and the lock-up clutch. In a first example of the system, the system further includes wherein the request to induce the vehicle side-slip includes a particular mode of vehicle operation having been preselected and one or more of an indication of an understeer angle being greater than a threshold understeer angle for greater than a threshold duration, and an indication that a first paddle shifter and a second paddle shifter for changing transmission gearing have both been depressed for greater than a predetermined time threshold. A second example of the system optionally includes the first example, and further comprises a rear differential, and wherein the controller stores further instructions to lock the rear differential in response to commanding open one or more of the driveline disconnect clutch and the lock-up clutch. A third example of the system optionally includes any one or more or each of the first through second examples, and further includes wherein the controller stores further instructions to maintain a current gear of the automatic transmission between commanding open and commanding closed one or more of the driveline disconnect clutch and the lock-up clutch.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for inducing vehicle side slip, comprising:
opening a sole driveline disconnect clutch positioned between an engine and an electric machine upstream of a transmission in response to a request to induce vehicle side slip; and
closing the open sole driveline disconnect clutch after opening the sole driveline disconnect clutch without shifting gears of the transmission in response to the request to induce vehicle side slip.

2. The method of claim 1, where opening the sole driveline disconnect clutch includes fully opening the sole driveline disconnect clutch, where closing the open sole driveline disconnect clutch includes fully closing the open sole driveline disconnect clutch, and where closing the open sole driveline disconnect clutch includes closing the open sole driveline disconnect clutch within a predetermined amount of time after opening the sole driveline disconnect clutch, and further comprising:
raising an engine speed during the predetermined amount of time.

3. The method of claim 2, further comprising controlling a torque output of the electric machine to a set of driven wheels during the predetermined amount of time.

4. The method of claim 3, wherein the torque output of the electric machine is controlled such that the electric machine does not provide any torque to the set of driven wheels during the predetermined amount of time.

5. The method of claim 3, wherein the torque output of the electric machine to the set of driven wheels is variable during the predetermined amount of time.

6. The method of claim 3, wherein the torque output of the electric machine to the set of driven wheels includes a requested torque amount at a time corresponding to the opening of the sole driveline disconnect clutch.

7. The method of claim 3, further comprising commanding the set of driven wheels to a same rotational speed in response to the opening the sole driveline disconnect clutch.

8. The method of claim 1, further comprising responsive to opening the sole driveline disconnect clutch, maintaining open a torque converter lock-up clutch under conditions where the torque converter lock-up clutch is open; and
maintaining closed the torque converter lock-up clutch under conditions where the torque converter lock-up clutch is closed.

9. The method of claim 1, further comprising opening the sole driveline disconnect clutch in response to an indication of an understeer angle greater than a threshold understeer angle for greater than a threshold duration of time.

10. The method of claim 1, further comprising opening the sole driveline disconnect clutch in response to a first paddle shifter and a second paddle shifter associated with a vehicle steering wheel being simultaneously depressed for greater than a predetermined time threshold.

11. A method for inducing a vehicle side slip, comprising:
opening a lock-up clutch of a torque converter in response to a first set of predetermined conditions being met for inducing the vehicle side slip, the torque converter positioned downstream of transmission propulsion; and
closing the lock-up clutch after opening the lock-up clutch without shifting gears of a transmission in response to a second set of predetermined conditions being met.

12. The method of claim 11, further comprising controlling an engine speed and an electric machine speed after opening the lock-up clutch and prior to closing the lock-up clutch; and
wherein the torque converter positioned downstream of transmission propulsion further includes the torque converter positioned downstream of an electric machine and upstream of the transmission, the electric machine positioned downstream of a driveline disconnect clutch positioned between an engine and the electric machine.

13. The method of claim 12, wherein a transmission input speed is lower than the engine speed and/or the electric machine speed when the lock-up clutch is closed.

14. The method of claim 12, wherein the driveline disconnect clutch is closed when the lock-up clutch is opened and at least one gear clutch of the transmission is closed when the lock-up clutch is opened;
wherein the disconnect clutch is maintained closed between opening the lock-up clutch and closing the lock-up clutch; and
wherein torque from one or more of the engine and the electric machine is delivered to a set of driven wheels between opening the lock-up clutch and closing the lock-up clutch.

15. The method of claim 12, further comprising commanding open the driveline disconnect clutch simultaneously with opening the lock-up clutch;
increasing the engine speed and controlling the electric machine speed to match the engine speed; and
closing the driveline disconnect clutch in response to a third set of predetermined conditions being met, where closing the driveline disconnect clutch occurs prior to the lock-up clutch being commanded closed.

16. The method of claim 12, further comprising commanding open the driveline disconnect clutch simultaneously with opening the lock-up clutch;
increasing the engine speed and controlling the electric machine speed to a higher or a lower speed than the engine speed; and
closing the driveline disconnect clutch in response to a fourth set of predetermined conditions being met, where closing the driveline disconnect clutch occurs after the lock-up clutch is closed.

17. A system for a hybrid electric vehicle, comprising:
a driveline disconnect clutch positioned between an engine and an electric machine;
a torque converter including a lock-up clutch positioned between the electric machine and an automatic transmission; and a controller with computer readable instructions stored on non-transitory memory that when executed, cause the controller to:
  receive a request to induce a vehicle side-slip;
  command open one or more of the driveline disconnect clutch and the lock-up clutch and in response, control an engine speed and an electric machine speed; and
  command closed one or more of the driveline disconnect clutch and the lock-up clutch in response to the request to induce the vehicle side-slip after a predetermined amount of time has elapsed since commanding open one or more of the driveline disconnect clutch and the lock-up clutch.

18. The system of claim 17, wherein the request to induce the vehicle side-slip includes a particular mode of vehicle operation having been preselected and one or more of an indication of an understeer angle being greater than a threshold understeer angle for greater than a threshold duration, and an indication that a first paddle shifter and a second paddle shifter for changing transmission gearing have both been depressed for greater than a predetermined time threshold.

19. The system of claim 17, further comprising a rear differential; and
  wherein the controller stores further instructions to lock the rear differential in response to commanding open one or more of the driveline disconnect clutch and the lock-up clutch.

20. The system of claim 17, wherein the controller stores further instructions to maintain a current gear of the automatic transmission between commanding open and commanding closed one or more of the driveline disconnect clutch and the lock-up clutch.

* * * * *